(12) United States Patent
Marupaduga

(10) Patent No.: US 11,445,421 B2
(45) Date of Patent: *Sep. 13, 2022

(54) LOAD BALANCING WIRELESS ACCESS NODE USAGE BASED ON ACTIVE USERS

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 103 days.

This patent is subject to a terminal disclaimer.

(21) Appl. No.: 16/999,898

(22) Filed: Aug. 21, 2020

(65) Prior Publication Data

US 2022/0060955 A1 Feb. 24, 2022

(51) Int. Cl.
*H04W 36/14* (2009.01)
*H04W 76/27* (2018.01)
(Continued)

(52) U.S. Cl.
CPC ............ *H04W 36/14* (2013.01); *H04W 8/04* (2013.01); *H04W 28/0819* (2020.05); *H04W 72/0453* (2013.01); *H04W 76/27* (2018.02)

(58) Field of Classification Search
CPC ..... H04W 24/10; H04W 48/16; H04W 48/20; H04W 36/14; H04W 28/0819; H04W 72/0453; H04W 76/27; H04W 36/00837; H04W 36/0069; H04W 36/30; H04W 76/16; H04W 36/0058; H04W 36/00835; H04W 36/0085; H04W 36/0094; H04W 36/08; H04W 36/20; H04W 76/15; H04W 88/06; H04W 88/10; H04W 36/0027; H04W 36/0066; H04W 52/146; H04W 52/365; H04W 48/02; H04W 48/18; (Continued)

(56) References Cited

U.S. PATENT DOCUMENTS 8,369,333 B2 2/2013 Hao et al.
8,494,545 B2 7/2013 Guo et al.
(Continued)

FOREIGN PATENT DOCUMENTS

WO 2016186742 A1 11/2016
WO 2020167197 A1 8/2020

*Primary Examiner* — Hassan A Phillips
*Assistant Examiner* — Hicham B Foud

(57) ABSTRACT

A wireless communication network to serve a wireless User Equipment (UE) with a wireless communication service over multiple wireless communication links. The wireless communication network comprises a primary access node, a first support access node, and a second support access node. The primary access node receives signal metrics for the support access nodes from the wireless UE, determines add thresholds for the support access nodes based on the amount of active UEs served by the primary access node, and converts the signal metrics for the support access nodes into add values for the support access nodes. When the add values are greater than the add thresholds, the primary access node signals the corresponding ones of the support access nodes to serve the wireless UE. The corresponding ones of the support access nodes exchange user data with the wireless UE.

18 Claims, 11 Drawing Sheets

(51) Int. Cl.
  *H04W 8/04* (2009.01)
  *H04W 28/08* (2009.01)
  *H04W 72/04* (2009.01)

(58) Field of Classification Search
  CPC ...... H04W 52/34; H04W 76/25; H04L 47/14; H04B 17/318
  See application file for complete search history.

(56) References Cited

U.S. PATENT DOCUMENTS

| | | | |
|---|---|---|---|
| 8,824,286 B2 | 9/2014 | Lee et al. | |
| 8,849,282 B2 | 9/2014 | Serravalle et al. | |
| 8,954,075 B2 | 2/2015 | Paterson | |
| 9,072,039 B2 | 6/2015 | Hu et al. | |
| 9,173,140 B2* | 10/2015 | Agrawal | H04W 36/0085 |
| 9,204,315 B2 | 12/2015 | Sridhar | |
| 9,288,717 B2 | 3/2016 | Jang | |
| 11,039,367 B1* | 6/2021 | Vivanco | H04W 36/0069 |
| 11,064,425 B1* | 7/2021 | Cui | H04W 48/18 |
| 11,116,041 B1* | 9/2021 | Saha | H04W 24/10 |
| 2004/0143842 A1* | 7/2004 | Joshi | H04W 48/08 725/32 |
| 2006/0056344 A1* | 3/2006 | Roy | H04W 36/06 370/329 |
| 2008/0049675 A1* | 2/2008 | Burgan | H04W 36/24 370/331 |
| 2009/0181693 A1* | 7/2009 | So | H04W 40/22 455/453 |
| 2013/0021962 A1* | 1/2013 | Hu | H04W 48/20 370/315 |
| 2013/0223410 A1* | 8/2013 | Karlsson | H04L 5/0091 370/332 |
| 2016/0029376 A1* | 1/2016 | Fukuta | H04W 74/0833 370/329 |
| 2016/0073312 A1* | 3/2016 | Sridhar | H04W 48/16 370/235 |
| 2016/0112902 A1 | 4/2016 | Huh et al. | |
| 2016/0242088 A1 | 8/2016 | Wang et al. | |
| 2016/0353340 A1* | 12/2016 | Yang | H04W 36/0058 |
| 2017/0026868 A1* | 1/2017 | Gupta | H04W 28/0215 |
| 2017/0055187 A1* | 2/2017 | Kang | H04W 36/0058 |
| 2017/0303286 A1* | 10/2017 | Sang | H04W 72/0413 |
| 2017/0325137 A1* | 11/2017 | Decarreau | H04W 48/18 |
| 2017/0359116 A1* | 12/2017 | Hwang | H04W 40/244 |
| 2018/0132269 A1 | 5/2018 | Wang et al. | |
| 2018/0249388 A1* | 8/2018 | Baek | H04W 36/305 |
| 2018/0249390 A1* | 8/2018 | Agiwal | H04W 76/20 |
| 2018/0332659 A1* | 11/2018 | Hwang | H04W 74/0833 |
| 2019/0014501 A1* | 1/2019 | Fotiadis | H04W 76/27 |
| 2019/0069325 A1 | 2/2019 | Yerramalli et al. | |
| 2019/0357105 A1* | 11/2019 | Zhang | H04W 36/18 |
| 2020/0107232 A1* | 4/2020 | Dong | H04W 76/27 |
| 2021/0360468 A1* | 11/2021 | Nieto Aliques | H04W 76/16 |

* cited by examiner

LOAD BALANCING WIRELESS ACCESS
NODE USAGE BASED ON ACTIVE USERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

A wireless access node that provides dual connectivity simultaneously serves a single user device over parallel LTE and 5G wireless such as 5GNR or Millimeter Wave (MMW). An Evolved Universal Terrestrial Radio Access Network Dual Connectivity (EN-DC) node comprises both an LTE eNodeB and one or more 5G wireless nodes. An EN-DC user device initially attaches to the LTE eNodeB in the EN-DC node. The EN-DC user device reports 5G signal quality for the 5G nodes to the LTE eNodeB. The LTE eNodeB determines if any of the 5G nodes should be used to serve the EN-DC user device based on the signal quality. To determine if a 5G access node should be used, the LTE eNodeB compares the received signal quality for the 5GNR gNodeB at the EN-DC user device to a threshold that is referred to as "B1". The LTE eNodeB may also consider frequency offsets and hysteresis along with signal quality.

Wireless user devices that exchange user data with a wireless access node have an active connection to the wireless access node. Conversely, wireless user devices that are not exchanging data with the wireless access node may have an idle connection to the wireless access node. The different states of connection that the wireless user devices have with the wireless access node are associated with different amounts of radio resources. The wireless access node uses radio resources to exchange wireless signals with the wireless user devices. The wireless access node has a limited amount of radio resources. If the wireless access node serves a relatively large number of active wireless user devices, the ability of the wireless access node to exchange wireless signals with the wireless user devices is reduced. A wireless user device with an active connection is referred to as "Radio Resource Control (RRC) connected".

Unfortunately, the wireless access nodes do not effectively and efficiently mitigate disruptions in wireless communications caused by large amounts of active wireless user devices.

TECHNICAL OVERVIEW

A wireless communication network serves a wireless User Equipment (UE) with a wireless communication service over multiple wireless communication links. The wireless communication network comprises a Primary Access (P1) node, a First Support Access (S1) node, and a Second Support Access (S2) node. The P1 node wirelessly receives signal metrics for the S1 node and signal metrics for S2 node from the wireless UE. The P1 node determines a First Add Threshold (S1TH) for the S1 node based on an amount of active wireless UEs served by the P1 node and determines a Second Add Threshold (S2TH) for the S2 node based on the amount of active wireless UEs served by the P1 node. The P1 node converts the signal metrics for the S1 node into a First Add Value (S1AV) for the S1 node and converts the signal metrics for the S2 node into a Second Add Value (S2AV) for the S2 node. The P1 node determines when the S1AV is greater than the S1TH and determines when the S2AV is greater than the S2T. The P1 node signals the S1 node to serve the wireless UE and signals the wireless UE to attach to the S1 node when the S1AV is greater than the S1TH. The P1 node signals the S2 node to serve the wireless UE and signals the wireless UE to attach to the S2 node when the S2AV is greater than the S2TH. The S1 node wirelessly transfers user data for the wireless communication service to the wireless UE responsive to the signal from the P1 node. The S2 node wirelessly transfers user data for the wireless communication service to the wireless UE responsive to the signal from the P1 node.

DETAILED DESCRIPTION

Figure 1:
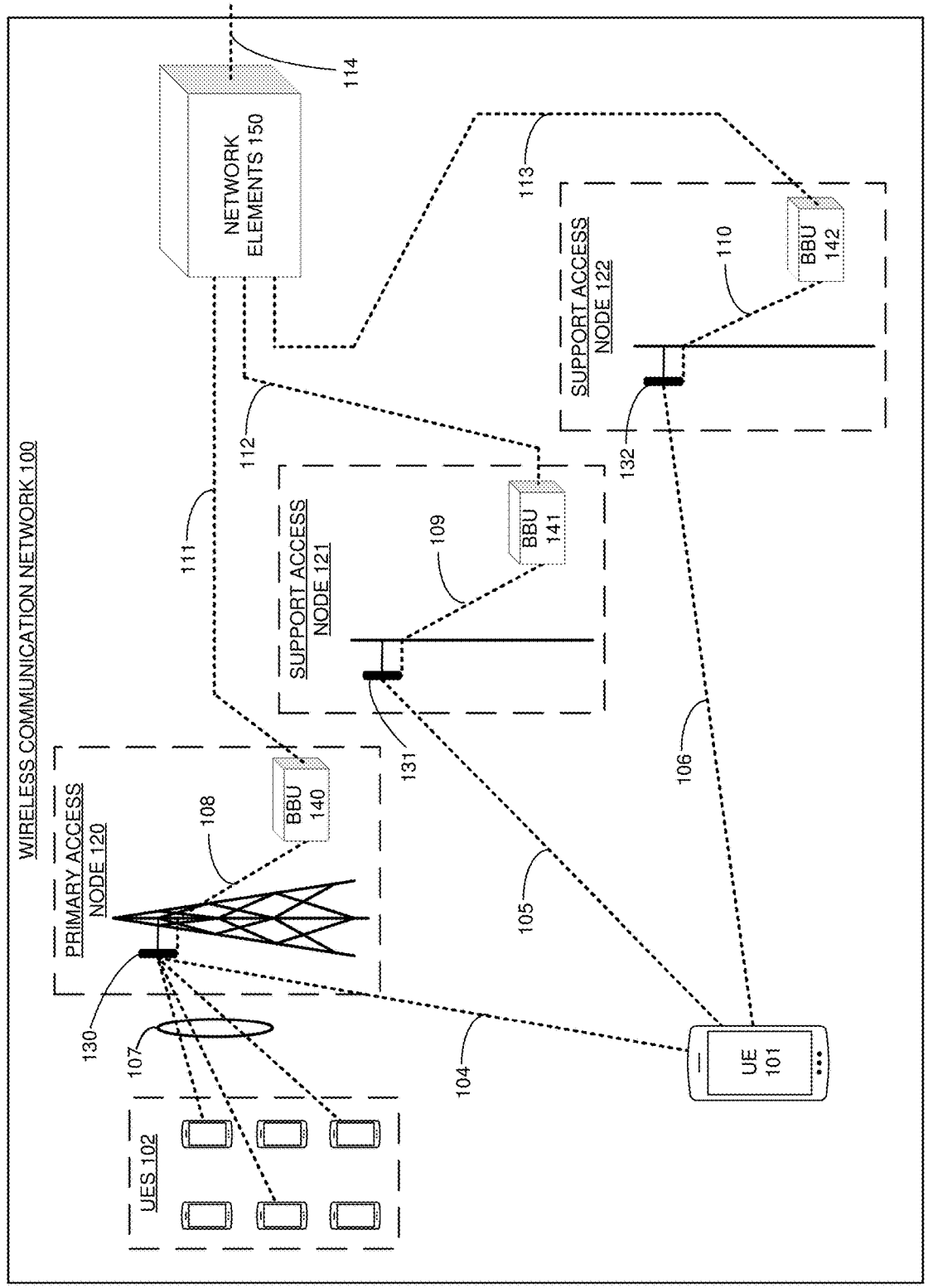
FIG. 1 illustrates a wireless communications network to serve a wireless User Equipment with a wireless communication service over multiple wireless links based on the amount of active wireless User Equipment (UE).

FIG. 1 illustrates wireless communication network 100 to serve wireless User Equipment (UE) 101 with a wireless communication service over multiple wireless links based on the amount of active UEs served by a primary access node. Wireless communication network 100 comprises wireless UE 101, UEs 102, primary access node 120, support access nodes 121-122, and network elements 150. Access nodes 120-122 comprise radios 130-132 and Baseband Units (BBUs) 140-142. A portion of UEs 102 comprises UEs that have an active connection to primary access node 102. A different portion of UEs 102 comprises UEs that do that have an active connection to primary access node 120.

Various examples of network operation and configuration are described herein. In some examples, UE 101 wirelessly attaches to radio 130. Radio 130 wirelessly exchanges user data with UE 101. Radio 130 exchanges the user data with BBU 140. BBU 140 exchanges the user data with network elements 150. Network elements 150 exchange the user data with external systems. UE 101 measures signal metrics for support access nodes 121-122. Exemplary signal metrics comprise Received Signal Code Power (RSCP), Received Signal Received Power (RSRP), Received Signal Received Quality (RSRQ), Energy per Chip over Noise Spectral Density (Ec/No), Receiver Level (RxLev), or some other radio measurement. UE 101 exchanges the signal metrics with primary access node 120.

Primary access node 120 serves wireless UEs 102. Primary access node 120 determines an add threshold for support access nodes 121 based on the amount of active UEs. Primary access node 120 determines an add threshold for support access nodes 122 based on the amount of active UEs served by primary access node 120. Primary access node 120 converts the signal metrics for support access node 121 into an add value for support access nodes 121. Primary access node 120 converts the signal metrics for support access node 122 into an add value for support access node 122. When the add value for support access node 121 is greater than the add threshold for support access node 121, primary access node 120 directs support access node 121 to wirelessly exchange user data with UE 101. Likewise, when the add value for support access node 122 is greater than the add threshold for support access node 122, primary access node 120 directs support access node 122 to wirelessly exchange user data with UE 101. Primary access node 120 signals UE 101 to attach to support access nodes 121 when the add value for support access node 121 exceeds the add threshold for support access node 121. Primary access node 120 signals UE 101 to attach to support access nodes 122 when the add value for support access node 122 exceeds the add threshold for support access node 122. Support access nodes 121 and 122 wirelessly exchange user data with UE 101.

UE 101, UEs 102, and radios 130-132 comprise antennas, amplifiers, filters, modulation, analog/digital interfaces, microprocessors, software, memories, transceivers, bus circuitry, and the like. Although UE 101 and UEs 102 are depicted as smartphones, UE 101 and UEs 102 might instead comprise computers, robots, vehicles, or other data appliances with wireless communication circuitry. Radios 130-132 are mounted on a tower, but radios 130-132 may use other mounting structures or no mounting structure at all.

BBUs 140-142, and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Access nodes 120-122 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, Long-Term Evolution (LTE) eNodeBs, WIFI hotspots, Low-Power Wide Area Network (LP-WAN) nodes, and/or some other wireless network apparatus. Network elements 150 comprise User Plane Functions (UPFs), Access and Mobility Management Function (AMFs), System Architecture Evolution Gateways (SAE GWs), Mobility Management Entities (MMEs), and/or some other network apparatus.

Wireless links 104-107 use over-the-air air electromagnetic frequencies in the low-band, mid-band, high-band, or some other portion of the electromagnetic spectrum. Wireless links 104-107 use protocols like 5GNR, LTE, MMW, Institute of Electrical and Electronic Engineers (IEEE) 802.11 (WIFI), LP-WAN, and/or some other format of wireless protocol. Links 108-114 use metal, glass, air, or some other media. Links 108-114 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 103-114 may comprise intermediate network elements like relays, routers, and controllers.

Figure 2:
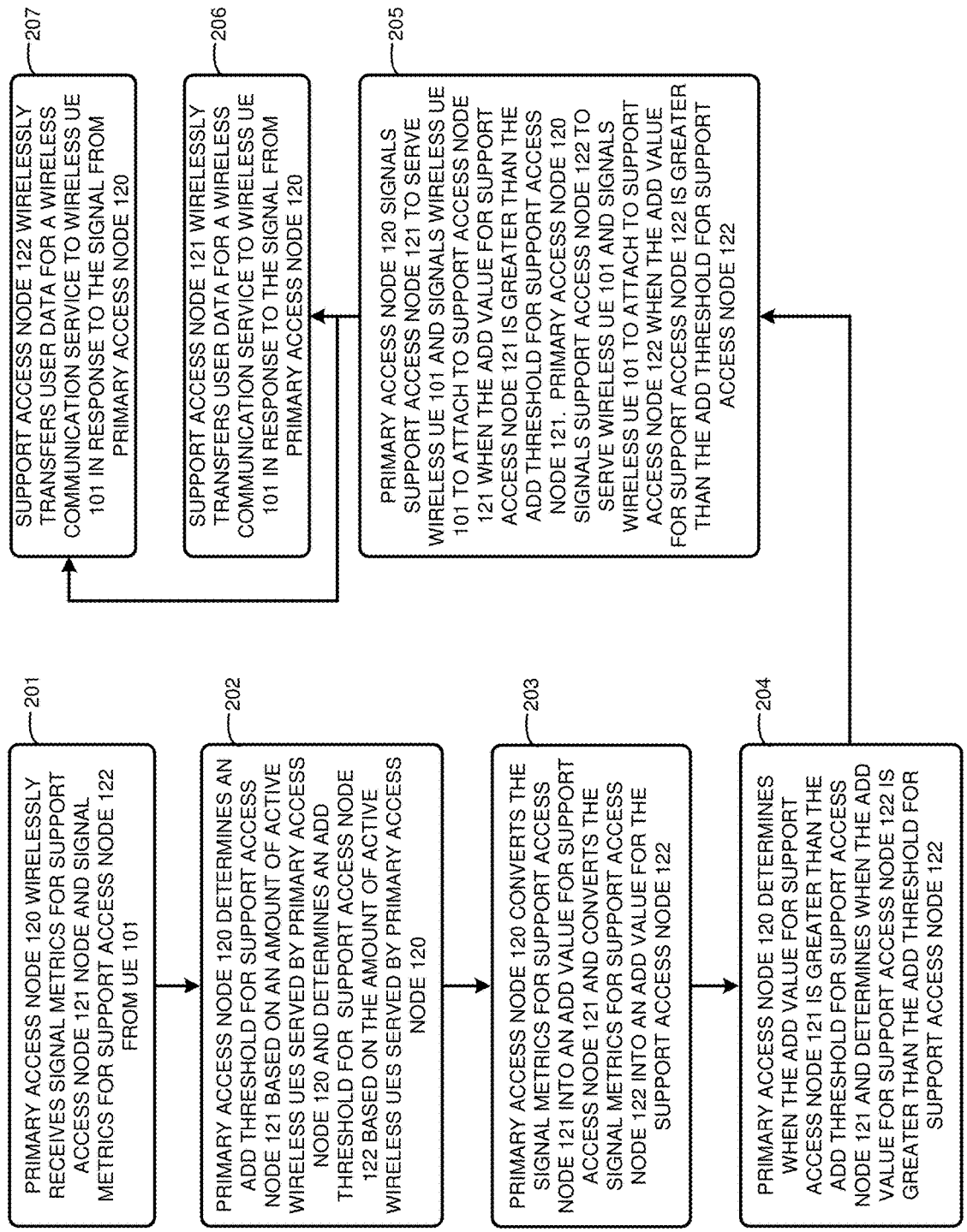
FIG. 2 illustrates an exemplary operation of the wireless communication network to serve the wireless UE over multiple wireless links based on the amount of active wireless UEs.

FIG. 2 illustrates an exemplary operation of wireless communication network 100 to serve wireless UE 101 with a wireless communication service over multiple wireless links based on the amount of active UEs served by primary access node 120. Primary access node 120 wirelessly receives signal metrics for support access node 121 node and signal metrics for support access node 122 from UE 101 (201). Primary access node 120 determines an add threshold for support access node 121 based on an amount of active wireless UEs served by primary access node 120 and determines an add threshold for support access node 122 based on the amount of active wireless UEs served by primary access node 120 (202). For example, primary access node 120 may select a high add threshold for a support access node when the amount of active wireless UEs served by primary access node 120 is high. Conversely, primary access node 120 may select a low add threshold for a support access node when the amount of active wireless UEs served by primary access node 120 is low. Primary access node 120 converts the signal metrics for support access node 121 into an add value for support access node 121 and converts the signal metrics for support access node 122 into an add value for support access node 122 (203).

Primary access node 120 determines when the add value for support access node 121 is greater than the add threshold for support access node 121 and determines when the add value for support access node 122 is greater than the add threshold for support access node 122 (204). Primary access node 120 signals support access node 121 to serve wireless UE 101 and signals wireless UE 101 to attach to support access node 121 when the add value for support access node 121 is greater than the add threshold for support access node 121. Primary access node 120 signals support access node 122 to serve wireless UE 101 and signals wireless UE 101 to attach to support access node 122 when the add value for support access node 122 is greater than the add threshold for support access node 122 (205). Support access node 121 wirelessly transfers user data for a wireless communication service to wireless UE 101 in response to the signal from primary access node 120 (206). Support access node 122 wirelessly transfers user data for a wireless communication service to wireless UE 101 in response to the signal from primary access node 120 (207).

Figure 3:
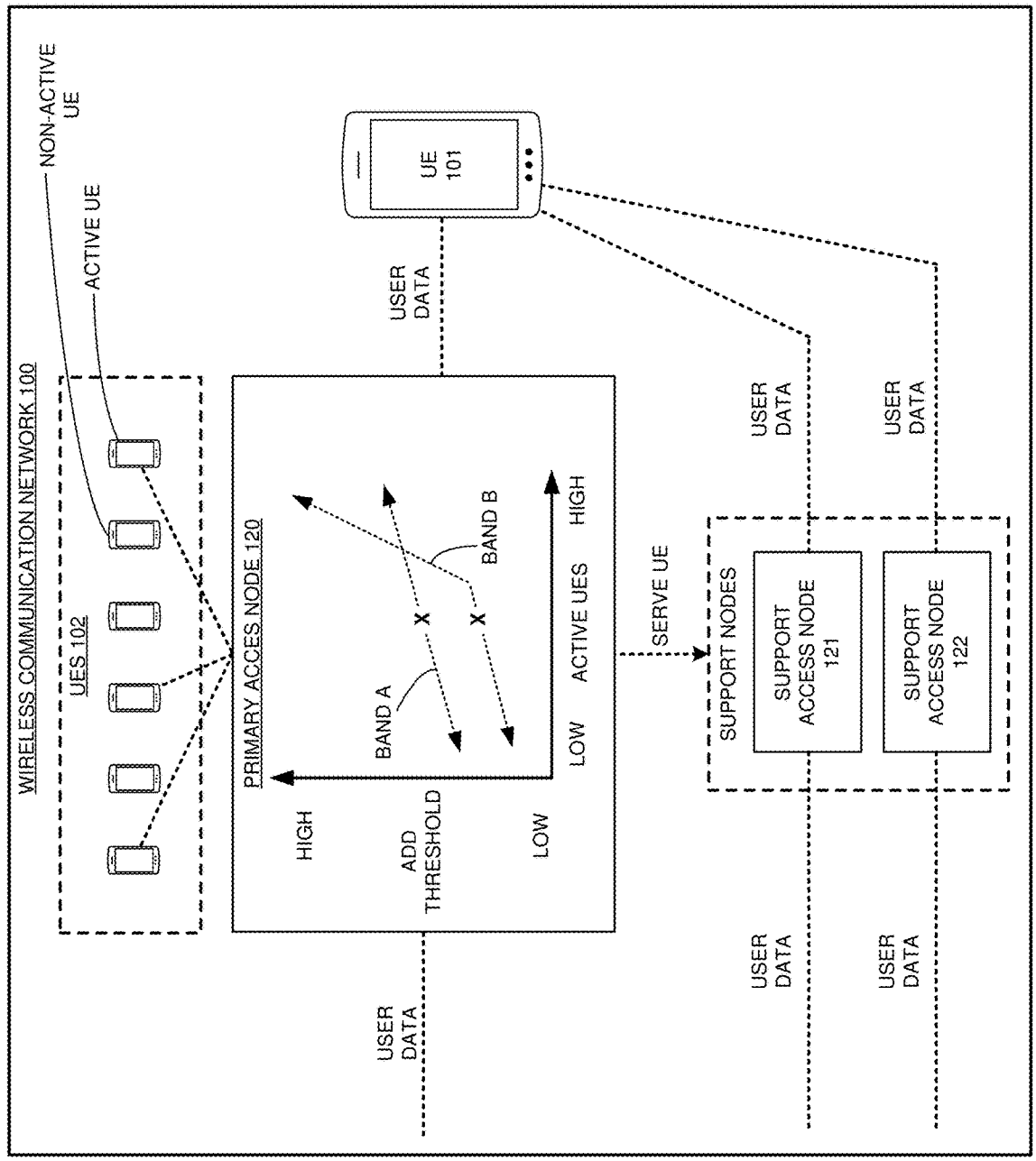
FIG. 3 illustrates an exemplary operation of the wireless communication network to serve the wireless UE over multiple wireless links based on the amount of active wireless UEs.

FIG. 3 illustrates an exemplary operation of wireless communication network 100 to serve wireless UE 101 with a wireless communication service over multiple wireless links based on the amount of active UEs. Primary access node 120 serves wireless UEs 102. As shown in FIG. 3, a portion of wireless UEs 102 comprises active UEs and another portion of wireless UEs 102 comprises non-active UEs. The amount of active UEs is the number of active UEs served by primary access node 120.

Primary access node 120 hosts a data structure that implements the graph shown on FIG. 3. The vertical axis of the graph indicates an add threshold in an exemplary range: Low to High. The horizontal axis indicates an amount of active UEs in an exemplary range: Low to High. These terms are illustrative and numerical values could be used. Primary access node 120 implements add threshold correlations to select add thresholds for the support access nodes. As indicated by the X marks on the graph, an amount of active UEs correlates to an add threshold. Primary access node 120 implements separate add threshold correlations for each of support access nodes 121 and 122. The add threshold correlation for support access node 121 corresponds to the frequency band used by support access node 121. Similarly, the add threshold correlation for support access node 122 corresponds to the frequency band used by support access node 122. Primary access node 120 determines the add thresholds for support access nodes 121 and 122 based on the amount of active UEs served by primary access node 120 and the data structure.

UE 101 attaches to primary access node 120. UE 101 wirelessly transfers signal metrics for support access node 121 and signal metrics for support access node 122 to primary access node 120. The signal metrics indicate a signal strength and/or signal quality. For example, the signal metrics may include RSCP, RSRP, RSRQ, Ec/No, RxLev, or some other radio measurement. Primary access node 120 receives the signal metrics for support access nodes 121 and 122 from UE 101. Primary access node 120 converts the signal metrics for support access node 121 into an add value for support access node 121 and converts the signal metrics for support access node 122 into an add value for support access node 122. When the add values are less than their corresponding the add thresholds, primary access node 120 does not add support access node 121 or support access node 122. When the add value for support access node 121 is greater than the add threshold for support access node 121, primary access node 120 directs support access node 121 to serve UE 101 with the wireless communications service and signals UE 101 to attach to support access node 121. Likewise, when the add value for support access node 122 is greater than the add threshold for support access node 122, primary access node 120 directs support access node 122 to serve UE 101 with the wireless communications service and signals UE 101 to attach to support access node 122. Support access nodes 121 and 122 wirelessly transfer user data for the wireless communications service to UE 101 in response to the signaling from primary access node 120.

In some examples, primary access node 120 determines add thresholds for support access nodes 121 and 122 based on the amount of active UEs served by primary access node 120 and the frequency bands used by support access nodes 121 and 122. Primary access node 120 may determine add thresholds for support access nodes 121 and 122 based on the amount of active UEs served by primary access node 120 and the channel size of the frequency bands used by support access nodes 121 and 122. In this example, primary access node 120 typically selects a high add threshold for a support access node that has a small channel size. Conversely, primary access node 120 selects a low add threshold for a support access node that has a large channel size.

Advantageously, primary access node 120 effectively and efficiently controls the add thresholds to mitigate service disruptions caused by large amounts of active UEs. Moreover, primary access node 120 effectively and efficiently controls the add thresholds to load balance the amount of UEs served by support access nodes 121 and 122.

Figure 4:
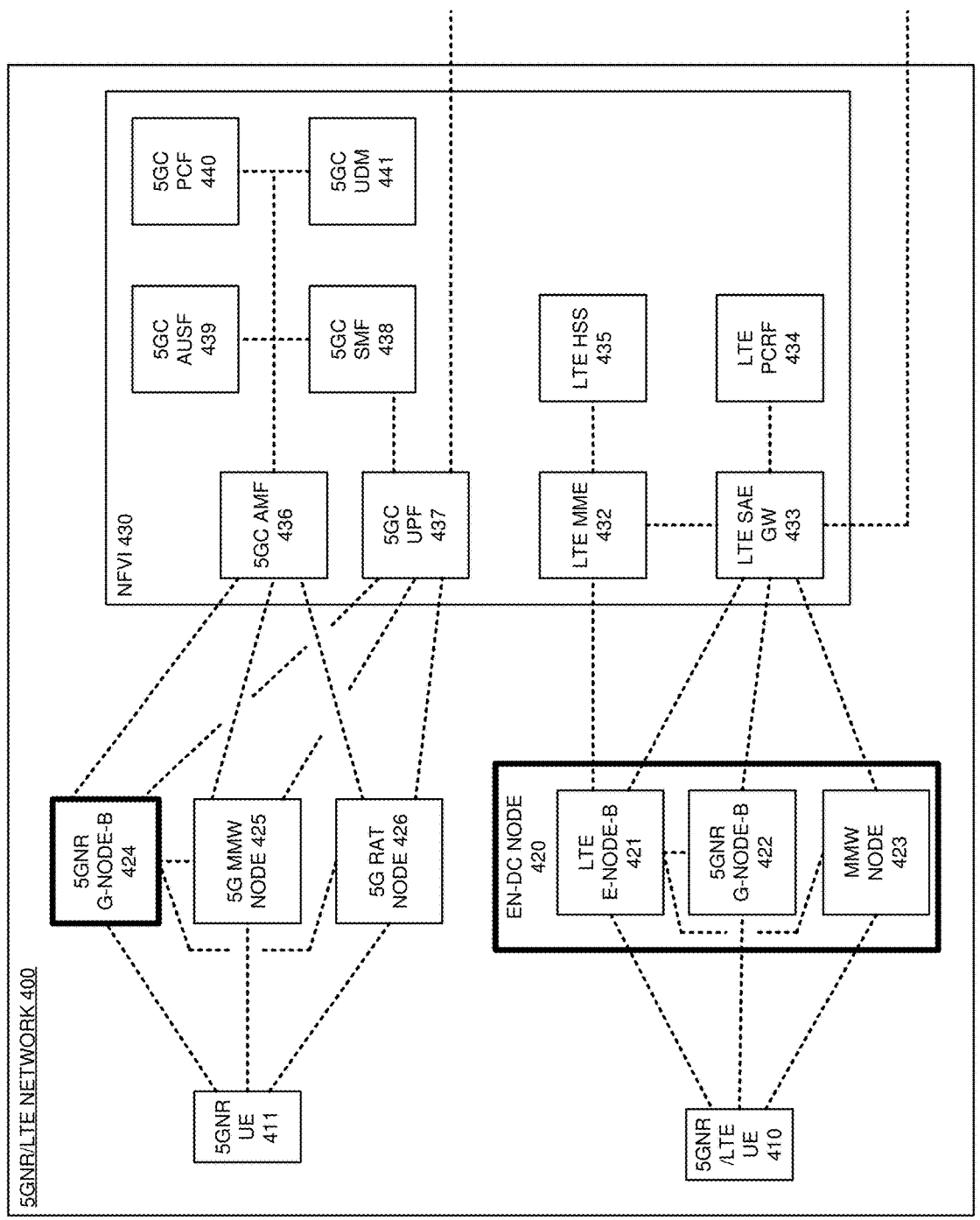
FIG. 4 illustrates a Fifth Generation New Radio (5GNR) Long Term Evolution (LTE) network to serve UEs over multiple wireless links based on the amount of RRC connected wireless UEs.

FIG. 4 illustrates Fifth Generation New Radio (5GNR) Long Term Evolution (LTE) network 400 to serve UEs 410-411 based on an amount of Radio Resource Control (RRC) Connected UEs served by a primary access node. An RRC connected UE is an example of an active UE. 5GNR/LTE network 400 is an example of wireless communication network 100, although network 100 may differ. 5GNR/LTE network 400 comprises 5GNR/LTE UE 410, 5GNR UE 411, EN-DC node 420, 5GNR gNodeB 424, 5G MMW node 425, 5G RAT node 426, and Network Function Virtualization Infrastructure (NFVI) 430. EN-DC node 420 comprises LTE eNodeB 421, 5GNR gNodeB 422, and MMW node 423. NFVI 430 comprises LTE Mobility Management Entity (MME) 432, LTE System Architecture Evolution Gateway (SAE GW) 433 LTE, LTE Policy Charging Rules Function (PCRF) 434, LTE Home Subscriber System (HSS) 435, Fifth Generation Core (5GC) Access and Mobility Management Function (AMF) 436, 5GC User Plane Function (UPF) 437, 5GC Session Management Function (SMF) 438, 5GC Authentication and Security Function (AUSF) 439, Policy Control Function (PCF 440), and 5GC Unified Data Manager (UDM) 441. In some examples, SAE GW 433 may be divided into a Serving Gateway (SGW) and a Packet Data Network Gateway (PGW).

UE 410 attaches to LTE eNodeB 421 in EN-DC node 420 and UE 410 indicates its 5G capabilities. LTE eNodeB 421 requests data service for UE 410 from LTE MME 432 over S1-MME signaling and indicates the 5G capabilities of UE 410. LTE MME 432 interacts with HSS 435 to authenticate and authorize LTE/5GNR UE 410 for wireless data services that are represented by Access Point Names (APNs). LTE MME 432 generates 5G instructions for 5GNR/LTE UE 410 in response to the 5G UE capabilities and the UE authorization. LTE MME 432 transfers the APNs for UE 410 to SAE GW 433. SAE GW 433 interacts with LTE PCRF 434 to select Quality-of-Service Class Identifiers (QCIs) and network addresses for UE 410 based on the APNs. SAE GW 433 transfers the APNs, QCIs, and network addresses for UE 410 to LTE MME 432. MME 432 transfers the APNs, QCIs, network address, and the 5G instructions for UE 410 to LTE eNodeB 421. LTE eNodeB 421 transfers the selected APNs, QCIs, network addresses, and 5G instructions to UE 410. LTE SAE GW 433 exchanges user data for UE 410 with external systems. SAE GW 433 exchanges the user data with LTE eNodeB 421. LTE eNodeB 421 exchanges the user data with UE 410.

In response to the 5G instructions, UE 410 measures the signal strength of the pilot signal from 5GNR gNodeB 422 and the pilot signal from MMW node 423. UE 410 transfers the signal strength measurements to LTE eNodeB 421. LTE eNodeB 421 determines frequency offset and hysteresis for 5GNR gNodeB 422 and for MMW node 423. LTE eNodeB 421 may store a data structure indicating add/drop thresholds for amounts of RRC connected UEs for multiple 5GNR gNodeBs and MMW nodes. LTE eNodeB 421 determines a B1 addition threshold for 5GNR gNodeB 422 and a B1 addition threshold for MMW node 423 based on the amount of RRC connected UEs served by LTE eNodeB 421. Typically, LTE eNodeB 421 selects a relatively high B1 addition threshold when the amount of RRC connected UEs served by LTE eNodeB 421 is relatively high. Likewise, LTE eNodeB 421 selects a relatively low B1 addition threshold when the amount of RRC connected UEs served by LTE eNodeB 421 is relatively low.

In some examples, LTE eNodeB 421 selects B1 thresholds based on the amount of RRC connected UEs served by LTE eNodeB 421 and the frequency bands of 5GNR gNodeB 422 and MMW node 423. LTE eNodeB 421 may determine the channel size of the frequency bands, the noise level for the frequency bands, the quality of the frequency bands, the frequency level (e.g. "high frequency" or "low frequency"), or some other frequency measurement to select B1 thresholds. In this example, LTE eNodeB 421 selects relatively high B1 thresholds when the channel size is small, the noise level is high, the quality is low, and/or the frequency is high. Conversely, LTE eNodeB 421 selects relatively low B1 thresholds when the channel size is large, the noise level is low, the quality is high, and/or the frequency is low.

LTE eNodeB 421 determines an inter Radio Access Technology (RAT) addition values for 5GNR gNodeB 422 and for MMW node 423. The inter-RAT addition value comprises a sum of the signal strength, the frequency offset, and the hysteresis. LTE eNodeB 421 determines when the inter-RAT addition value for 5GNR gNodeB 422 is greater than the B1 addition threshold for 5GNR gNodeB 422. LTE eNodeB 421 determines when the inter-RAT addition value for MMW node 423 is greater than the B1 addition threshold for MMW node 423. When the inter-RAT addition value for 5GNR gNodeB 422 is greater than the B1 addition threshold for 5GNR gNodeB 422, LTE eNodeB 421 directs 5GNR gNodeB 422 to serve UE 410 and directs UE 410 to attach to 5GNR gNodeB 422. Likewise, when the inter-RAT addition value for MMW node 423 is greater than the B1 addition threshold for MMW node 423, LTE eNodeB 421 directs MMW node 423 to serve UE 410 and directs UE 410 to attach to MMW node 423. LTE eNodeB 421 notifies LTE MME 432 and LTE MME 432 directs SAE GW 433 to serve UE 410 over 5GNR gNodeB 422 and MMW node 423. In response, LTE SAE GW 433 exchanges user data for UE 410 with 5GNR gNodeB 422 and MMW node 423. 5GNR gNodeB 422 exchanges the user data with UE 410. MMW node 423 exchanges the user data with UE 410.

LTE eNodeB 421 determines a B1 drop threshold for 5GNR gNodeB 422 based on the amount of RRC connected UEs served by LTE eNodeB 421. Similarly, LTE eNodeB 421 determines a B1 drop threshold for MMW node 423 based on the amount of RRC connected UEs served by LTE eNodeB 421. The B1 drop thresholds may comprises a different threshold value than the B1 addition thresholds. LTE eNodeB 421 receives subsequent 5GNR signal strength measurements for 5GNR gNodeB 422 and for MMW node 423 from UE 410. LTE eNodeB 421 determines an inter-RAT drop value for 5GNR gNodeB 422 based on the sum of the subsequent signal strength for 5GNR gNodeB 422, the frequency offset, and the hysteresis. LTE eNodeB 421 determines an inter-RAT drop value for MMW node 423 based on the sum of the subsequent signal strength for MMW node 422, the frequency offset, and the hysteresis. When the inter-RAT drop value for 5GNR gNodeB 422 is lower than the B1 drop threshold for 5GNR gNodeB 422, LTE eNodeB 421 signals 5GNR gNodeB 422 to stop serving UE 410 and signals UE 410 to detach from 5GNR gNodeB 422. When the inter-RAT drop value for MMW node 423 is lower than the B1 drop threshold for MMW node 423, LTE eNodeB 421 signals MMW node 423 to stop serving UE 410 and signals UE 410 to detach from MMW node 423. LTE MME 432 directs LTE SAE GW 433 to stop serving UE 410 over 5GNR gNodeB 422 and MMW node 423. In response, LTE SAE GW 433 stops exchanging the user data for UE 410 with 5GNR gNodeB 422 and MMW node 423. 5GNR gNodeB 422 and MMW node 423 stop exchanging the user data with UE 410.

Note that 5GNR gNodeB 424, 5G MMW node 425, and 5G RAT node 426 use different types of 5G Radio Access Technology (RAT). The different types of 5G RAT may have different frequency channels, resource block time intervals, and resource block bandwidths. For example, 5G RAT node 426 may provide an enhanced video broadcast service with unique time intervals and bandwidths. Some 5G UEs are not capable of using each type of 5G RAT from 5GNR gNodeB 424, 5G MMW node 425, and 5G RAT node 426, but 5GNR UE 411 is capable of using each type of 5G RAT. 5GNR UE 411 attaches to 5GNR gNodeB 424 and indicates its 5G capabilities for the multiple types of 5G RAT.

5GNR gNodeB 424 requests data service for UE 411 from 5GC AMF 436 over N2 signaling the indicates the 5G capabilities for UE 411. 5GC AMF 436 interacts with 5GC SMF 438, 5GC AUSF 439, 5GC UDM 441, and 5GC PCF 440 to authenticate and authorize 5GNR UE 411 for 5G data services. 5GC AMF 436 generates 5G instructions responsive to the 5G UE capabilities and the 5G authorization. 5GC AMF 436 transfers quality-of-service metrics, network addressing, and 5G instructions for UE 411 to 5GNR gNodeB 424 and 5GC SMF 438. 5GC SMF 438 directs 5GC UPF 437 to serve UE 411 per the quality-of-service metrics and network addressing over 5GNR gNodeB 424. 5GNR gNodeB 424 transfers the quality-of-service metrics, network addressing, and 5G instructions to UE 411.

In response to the 5G instructions, UE 411 measures signal strengths for 5G MMW node 425 and for 5G RAT node 426 and wirelessly transfers the signal strengths to 5GNR gNodeB 424. 5GNR gNodeB 424 determines the frequency offset, and hysteresis for MMW node 424 and for 5G RAT node 426. 5GNR gNodeB 424 determines an inter-RAT addition threshold for 5G MMW node 425 based on the amount of RRC connected UEs served by 5GNR gNodeB 424. Likewise, 5GNR gNodeB 424 determines an inter-RAT addition threshold for 5G RAT node 426 based on the amount of RRC connected UEs served by 5GNR gNodeB 424. 5GNR gNodeB 424 determines an inter-RAT addition value for 5G MMW node 425 based on the signal strength for 5G MMW node 425, the frequency offset, and the hysteresis. 5GNR gNodeB 424 determines an inter-RAT addition value for 5G RAT node 426 based on the signal strength for 5G RAT node 426, the frequency offset, and the hysteresis.

5GNR gNodeB 424 determines when the inter-RAT addition value for 5G MMW node 425 is greater than the inter-RAT addition threshold for 5G MMW node 425. 5GNR gNodeB 424 determines when the inter-RAT addition value for 5G RAT node 426 is greater than the inter-RAT addition threshold for 5G RAT node 426. When the inter-RAT addition value for 5G MMW node 425 is greater than the inter-RAT addition threshold for 5G MMW node 425, 5GNR gNodeB 424 directs 5G MMW node 425 to serve UE 411 and directs UE 411 to attach to 5G MMW node 425. When the inter-RAT addition value for 5G RAT node 426 is greater than the inter-RAT addition threshold for 5G RAT node 426, 5GNR gNodeB 424 directs 5G RAT node 426 to serve UE 411 and directs UE 411 to attach to 5G RAT node 426. 5GNR gNodeB 424 notifies 5GC AMF 436 of the attachments. 5GC AMF 436 directs 5GC SMF 438 to direct 5GC UPF 437 to serve UE 411 per the quality-of-service metrics and network addressing over 5G MMW node 425 and 5G RAT node 426. 5GNR UE 411 attaches to 5G MMW node 425 and 5G RAT node 426. 5G MMW node 425 and 5G RAT node 426 exchange user data with UE 411.

5GNR gNodeB 424 determines an inter-RAT drop threshold for 5G MMW node 425 and an inter-RAT drop threshold for 5G RAT node 426 based on the amount of RRC connected UEs served by 5GNR gNodeB 424. 5GNR gNodeB 424 receives subsequent signal strength measurements for 5G MMW node 425 and 5G RAT node 426 from UE 411. 5GNR gNodeB 424 determines an inter-RAT drop value for 5G MMW node 425 based on the subsequent signal strength for 5G MMW node 425, the frequency offset, and the hysteresis. 5GNR gNodeB 424 determines an inter-RAT drop value for 5G RAT node 426 based on the subsequent signal strength for 5G RAT node 426, the frequency offset, and the hysteresis. When the drop value for MMW node 425 is lower than the drop threshold for MMW node 425, 5GNR gNodeB 424 signals UE 411 to detach from 5G MMW node 425 and 5G MMW node 425 stops exchanging the user data with UE 411. When the drop value for 5G RAT node 426 is lower than the drop threshold for 5G RAT node 426, 5GNR gNodeB 424 signals UE 411 to detach from 5G RAT node 426 and 5G RAT node 426 stops exchanging the user data with UE 411.

In some examples, 5GNR gNodeB 424 selects inter-RAT add/drop thresholds based on the amount of RRC connected UEs served by 5GNR gNodeB 426 and the frequency bands of 5G MMW node 425 and 5G RAT node 426. 5GNR gNodeB 424 may determine the channel size of the frequency bands, the noise level for the frequency bands, the quality of the frequency bands, the frequency level (e.g. "high frequency" or "low frequency"), or some other frequency measurement to select inter-RAT thresholds. In this example, 5GNR gNodeB 424 selects relatively high B1 thresholds when the channel size is small, the noise level is high, the quality is low, and/or the frequency is high. Conversely, 5GNR gNodeB 424 selects relatively low B1 thresholds when the channel size is large, the noise level is low, the quality is high, and/or the frequency is low.

Advantageously, LTE eNodeB 421 effectively and efficiently manipulates B1 add/drop thresholds based on the amount of RRC connected UEs to load balance the amount of UEs served by 5GNR access nodes and MMW access nodes thereby mitigating service disruptions caused by relatively large amounts of RRC connected UEs. Likewise, 5GNR gNodeB 424 effectively and efficiently manipulates the inter-RAT add/drop thresholds based on the amount of RRC connected UEs to load balance the amount of UEs served by 5G MMW nodes and 5G RAT nodes to mitigate service disruptions caused by relatively large amounts of RRC connected UEs.

In some examples, UEs 410-411 select B1 add/drop thresholds based on an amount of RRC connected UEs served by EN-DC node 420 and 5GNR gNodeB 424. UEs 410-411 apply RRC connected UE metrics from EN-DC node 420 and 5GNR gNodeB 424 to the B1 thresholds to trigger measurement reports to LTE eNodeB 421 and 5GNR gNodeB 424 that indicate the RRC connected UE metrics.

Figure 5:
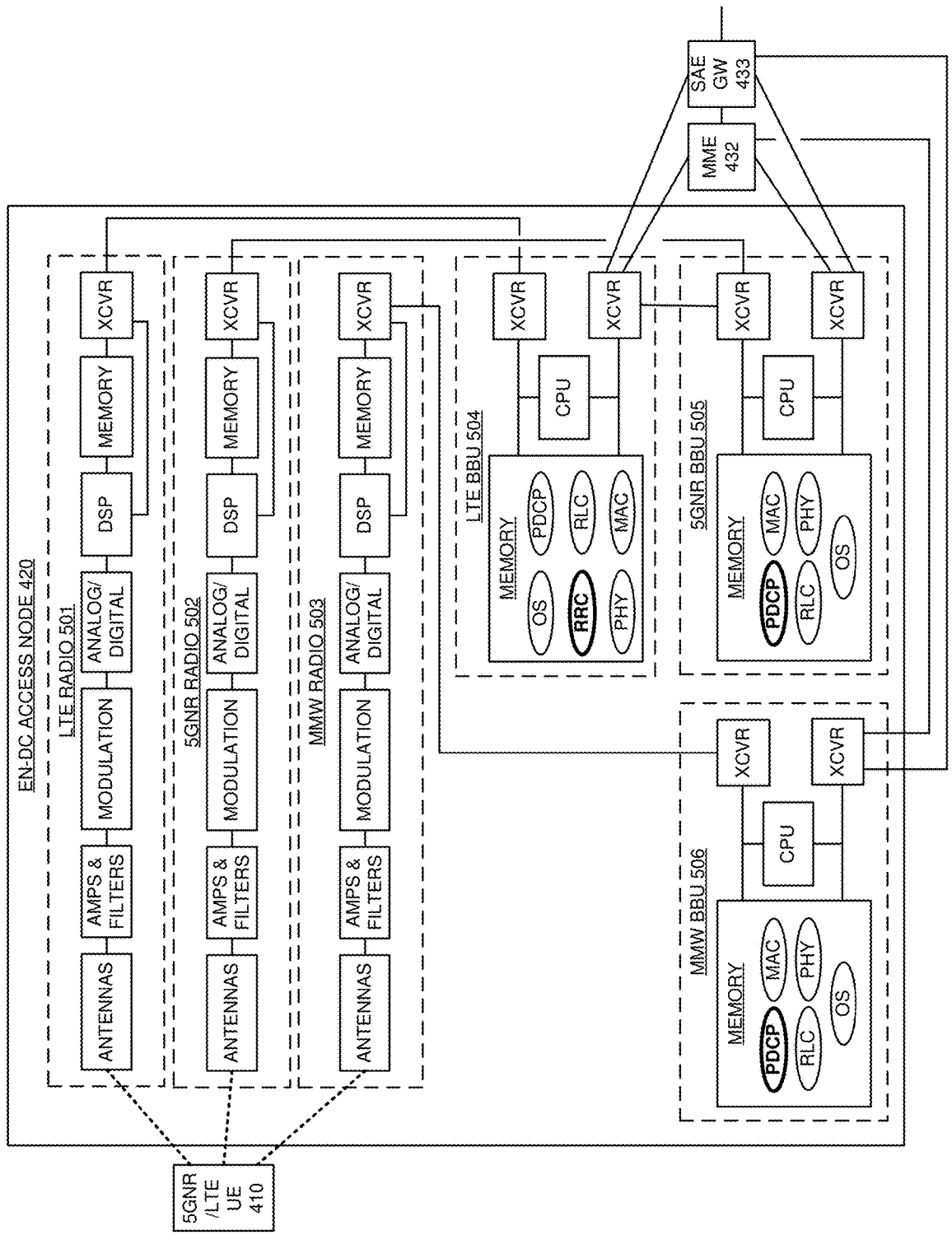
FIG. 5 illustrates an Evolved Universal Terrestrial Radio Access Network Dual Connectivity (EN-DC) access node to serve UEs over multiple wireless links based on the amount of RRC connected wireless UEs.

FIG. 5 illustrates EN-DC access node 420 to serve UE 410 over 5GNR and MMW based on the amount of RRC connected UEs. EN-DC access node 420 is an example of primary access node 120, although primary access node 120 may differ. As shown in FIG. 4, EN-DC access node 420 includes LTE eNodeB 421, 5GNR gNodeB 422, and MMW node 423, however LTE eNodeB 421, 5GNR gNodeB 422, and MMW node 423 are omitted for clarity. EN-DC access node 420 comprises LTE radio 501, 5GNR radio 502, MMW radio 503, LTE Baseband Unit (BBU) 504, 5GNR BBU 505, and MMW BBU 506. Radios 501-503 comprise antennas, amplifiers, filters, modulation, analog-to-digital interfaces, DSP, memory, and transceivers (XCVR) that are coupled over bus circuitry. BBUs 504-506 comprise memory, CPU, and transceivers that are coupled over bus circuitry. The memories in BBUs 504-506 store operating systems (OS) and network applications like Physical Layer (PHY), Media Access Control (MAC), Radio Link Control (RLC), Packet Data Convergence Protocol (PDCP), and Radio Resource Control (RRC). The CPU in BBUs 504-506 execute the operating systems, PHYs, MACs, RLCs, PDCPs, and RRCs to exchange network signaling with UE 410 and MME 432 and to exchange user data between UE 410 and SAE GW 433.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in LTE radio 501 over an LTE link. The transceiver in LTE radio 501 is coupled to a transceiver in LTE BBU 504 over Common Public Radio Interface (CPRI) links. A transceiver in LTE BBU 504 is coupled to MME 432 and SAE GW 433 over backhaul links. UE 410 is wirelessly coupled to the antennas in 5GNR radio 502 over an 5GNR link. The transceiver in 5GNR radio 502 is coupled to a transceiver in 5GNR BBU 505 over CPRI links. A transceiver in 5GNR BBU 505 is coupled to MME 432 and to SAE GW 433 over backhaul links. UE 410 is wirelessly coupled to the antennas in MMW radio 503 over a MMW link. The transceiver in MMW radio 503 is coupled to a transceiver in MMW BBU 506 over CPRI links. A transceiver in MMW BBU 506 is coupled to MME 432 and to SAE GW 433 over backhaul links. A transceiver in LTE BBU 504 is coupled to transceivers in 5GNR BBU 505 and MMW BBU 506 over X2 links.

In operation, UE 410 wirelessly attaches to LTE antennas in LTE radio 501. The LTE antennas in LTE radio 501 receive wireless LTE signals from UE 410 that transport Uplink (UL) LTE signaling, UL LTE data, and indicate 5G capabilities for UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5G capabilities of UE 410, to MME 432 over the backhaul links. MME 432 authenticates and authorizes 5GNR service and MMW service for UE 410, and in response to the authorization, MME 432 generates 5G instructions for UE 410. The LTE PDCP transfers the UL LTE data to LTE SAE GW 433 over the backhaul links.

In LTE BBU 504, the LTE RRC receives the DL S1-MME signaling and the 5G instructions from MME 432. The PDCP receives DL LTE data from SAE GW 433. The LTE network applications process the new DL LTE signaling and the DL LTE data to generate corresponding DL LTE symbols that carry the DL LTE signaling and DL LTE data. In LTE radio 501, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and 5G instructions to UE 410.

In response to the 5G instructions, UE 410 measures signal strengths for 5GNR gNodeBs and MMW nodes. UE 410 wirelessly transfers the 5GNR signal strengths and MMW signal strengths to LTE radio 501. LTE radio 501 exchanges the 5GNR signal strengths and MMW signal strengths with LTE BBU 504 over the CPRI links. The LTE RRC in LTE BBU 504 determines frequency offset, and hysteresis for 5GNR BBU 505 and for MMW BBU 506. In some examples, the LTE RRC in BBU 504 determines the frequency band for 5GNR BBU 505 and the frequency band for MMW BBU 506. LTE RRC in LTE BBU 504 may determine the channel size of the frequency bands, the amount of noise and/or interference for the frequency bands, the signal quality of the frequency bands, the frequency level (e.g. "high frequency" or "low frequency"), or some other frequency measurement.

The LTE RRC in BBU 504 determines a B1 add threshold for 5GNR BBU 505 based on the amount of RRC connected UEs served by LTE BBU 504. Similarly, the LTE RRC in BBU 504 determines a B1 add threshold for MMW BBU 506 based on the amount of RRC connected UEs served by LTE BBU 504. In some examples, LTE RRC in LTE BBU 504 determines B1 add thresholds based on the amount of RRC connected UEs served by LTE BBU 504 and the frequency bands of 5GNR BBU 505 and MMW BBU 506.

The LTE RRC in BBU 504 may select a relatively high B1 threshold when the channel size of the frequency band is small, the noise level for the frequency band is high, the signal quality of the frequency band is low, and/or the frequency band is high frequency. Conversely, the LTE RRC in LTE BBU 504 may select a relatively low B1 threshold when the channel size of the frequency band is large, the noise level for the frequency band is low, the signal quality of the frequency band is high, and/or the frequency band is low frequency.

The LTE RRC in BBU 504 determines an inter-RAT add value for 5GNR BBU 505 based on the sum of the signal strength, the frequency offset, and the hysteresis for 5GNR BBU 505. The LTE RRC in BBU 504 determines an inter-RAT add value for MMW BBU 506 based on the sum of the signal strength, the frequency offset, and the hysteresis for MMW BBU 506. The LTE RRC in BBU 504 determines when the inter-RAT add values are greater than the B1 add thresholds. When the inter-RAT add value for 5GNR BBU 505 exceeds the B1 add threshold for 5GNR BBU 505, the LTE RRC in BBU 504 directs the 5GNR PDCP in BBU 505 to serve UE 410. Likewise, when the inter-RAT add value for MMW BBU 506 exceeds the B1 add threshold for MMW BBU 506, the LTE RRC in BBU 504 directs the MMW PDCP in BBU 506 to serve UE 410. The LTE RRC in BBU 504 also directs UE 410 to attach to the 5GNR PDCP in 5GNR BBU 505 and to attach to the MMW PDCP in MMW BBU 506.

UE 410 attaches to the 5GNR PDCP in BBU 505 over 5GNR radio 502 and the MMW PDCP in BBU 506 over MMW radio 503. The LTE RRC in BBU 504 notifies MME 432 of the 5GNR and MMW attachments. MME 432 directs SAE GW 433 to serve UE 410 over 5GNR BBU 505 and MMW BBU 506. SAE GW 433 exchanges 5GNR data with the 5GNR PDCP in 5GNR BBU 505. SAE GW 433 exchanges MMW data with the MMW PDCP in MMW BBU 506. The 5GNR PDCP in BBU 505 exchanges the 5GNR data with the 5GNR PDCP in UE 410 over the RLCs, MACs, and PHYs. The MMW PDCP in BBU 506 exchanges the MMW data with the MMW PDCP in UE 410 over the RLCs, MACs, and PHYs.

In 5GNR radio 502, the antennas receive wireless 5GNR signals from UE 410 that transport Uplink (UL) 5GNR signaling and UL 5GNR data. In MMW radio 503, the antennas receive wireless MMW signals from UE 410 that transport UL MMW signaling and UL MMW data. The antennas in 5GNR radio 502 and MMW radio 503 transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR and MMW symbols from the UL digital signals. The CPUs execute the network applications to process the UL 5GNR and MMW symbols and recover the UL 5GNR and MMW signaling and the UL 5GNR and MMW data. The 5GNR PDCP processes the UL 5GNR signaling and DL X2 signaling from the LTE RRC in LTE BBU 504 to generate new UL X2 signaling and new DL 5GNR signaling. The MMW PDCP processes the UL MMW signaling and DL X2 signaling from the LTE RRC in LTE BBU 504 to generate new UL X2 signaling and new DL MMW signaling. The 5GNR PDCP transfers the new UL X2 signaling to the LTE RRC in BBU 504. The 5GNR PDCP transfers the UL 5GNR data to SAE GW 433 over backhaul links. The MMW PDCP transfers the new UL X2 signaling to the LTE RRC in BBU

504. The MMW PDCP transfers the UL MMW data to SAE GW 433 over backhaul links.

In 5GNR BBU 505, the 5GNR PDCP receives the DL X2 signaling from the LTE RRC in BBU 504. The 5GNR PDCP also receives DL 5GNR data from SAE GW 433. In MMW BBU 506, the MMW PDCP receives the DL X2 signaling from the LTE RRC in BBU 504. The MMW PDCP also receives DL MMW data from SAE GW 433. The 5GNR network applications process the new DL 5GNR signaling and the DL 5GNR data to generate corresponding DL 5GNR symbols that carry the DL 5GNR signaling and DL 5GNR data. The MMW network applications process the new DL MMW signaling and the DL MMW data to generate corresponding DL MMW symbols that carry the DL MMW signaling and DL MMW data. In 5GNR radio 502 and MMW radio 503, the DSPs process the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas in 5GNR radio 502 to emit corresponding wireless 5GNR signals that transport the DL 5GNR signaling and DL 5GNR data to UE 410. The electrical DL signals drive the antennas in MMW radio 503 to emit corresponding wireless MMW signals that transport the DL MMW signaling and DL MMW data to UE 410.

In this example, the LTE RRC in LTE BBU 504 also determines a B1 drop threshold for 5GNR BBU 505 and a B1 drop threshold for MMW BBU 506 based on the amount of RRC connected UEs served by LTE BBU 504. The LTE RRC in BBU 504 wirelessly receives subsequent 5GNR signal strength measurements for 5GNR BBU 505 and MMW signal strength measurements for MMW BBU 506 from UE 410. The LTE RRC in LTE BBU 504 determines inter-RAT drop values for 5GNR BBU 505 and MMW BBU 506 based on the subsequent signal strengths, the frequency offsets, and the hysteresis. The LTE RRC in LTE BBU 504 stops the service to UE 410 over 5GNR radio 502 when the inter-RAT drop value for 5GNR BBU 505 is less than the B1 drop threshold for 5GNR BBU 505. The LTE RRC in LTE BBU 504 stops the service to UE 410 over MMW radio 503 when the inter-RAT drop value for MMW BBU 506 is less than the B1 drop threshold for MMW BBU 506.

When the inter-RAT drop values are less than the corresponding B1 drop thresholds, the LTE RRC in LTE BBU 504 directs the 5GNR PDCP in BBU 505 and the MMW PDCP in MMW BBU 506 to stop serving UE 410 and notifies MME 432. The LTE RRC in LTE BBU 504 directs UE 410 to detach from 5GNR PDCP in 5GNR BBU 505 an to detach from the MMW PDCP in MMW BBU 506. UE 410 wirelessly detaches from 5GNR BBU 505 and/or MMW BBU 506. MME 432 directs SAE GW 433 to stop serving UE 410 over the detached BBUs. SAE GW 433 stops exchanging 5GNR data with the 5GNR PDCP in 5GNR BBU 505 and MMW data with the MMW PDCP in MMW BBU 506. The 5GNR PDCP in BBU 505 stops exchanging the 5GNR data with the 5GNR PDCP in UE 410 over the RLCs, MACs, and PHYs. The MMW PDCP in BBU 506 stops exchanging the MMW data with the MMW PDCP in UE 410 over the RLCs, MACs, and PHYs.

Figure 6:
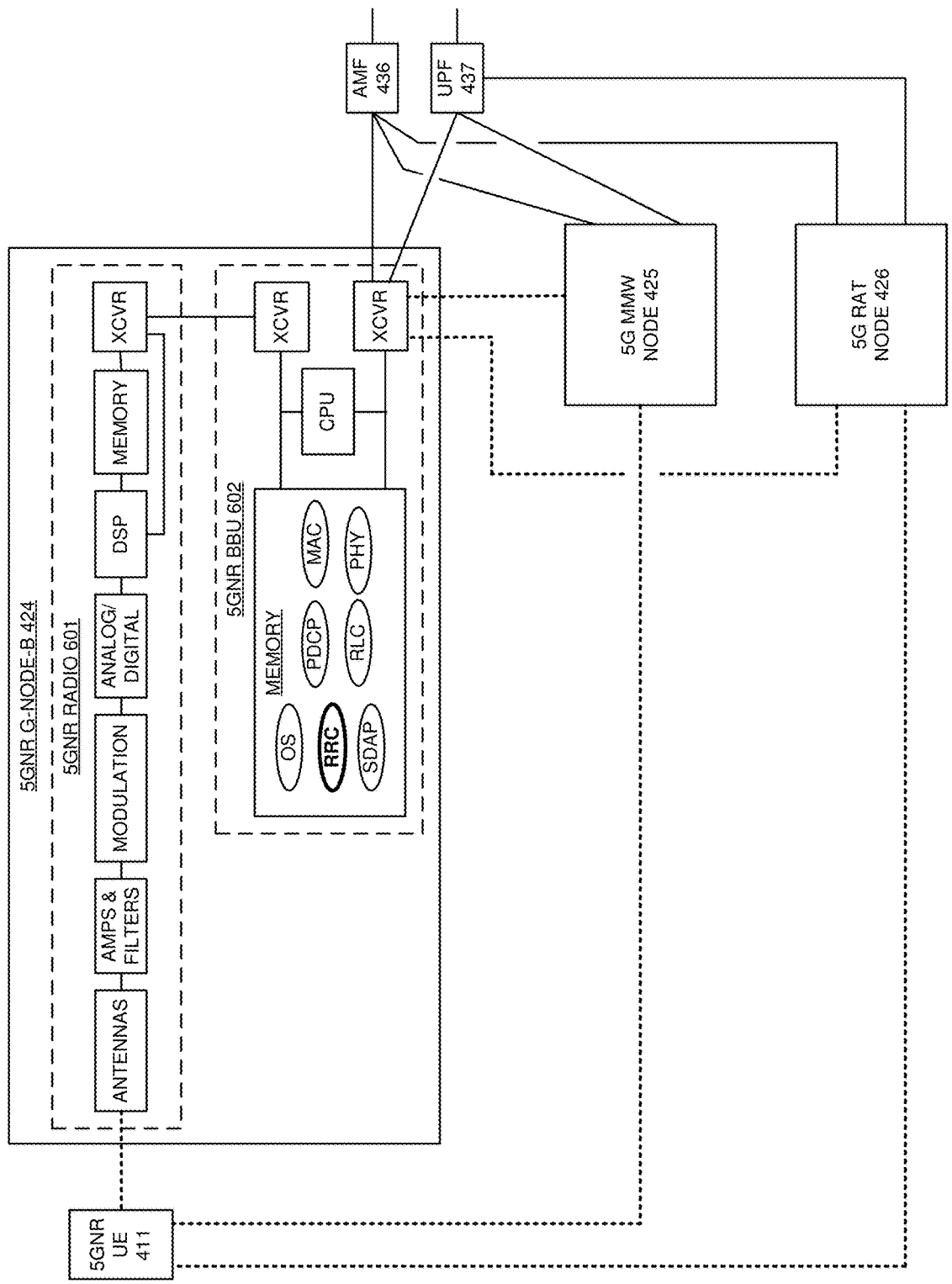
FIG. 6 illustrates a 5GNR gNodeB to serve UEs over multiple wireless links based on the amount of RRC connected wireless UEs.

FIG. 6 illustrates 5GNR gNodeB 424 to serve 5GNR UE 411 over 5G RAT and 5G MMW based on an amount of RRC connected UEs served by 5G gNodeB 424. 5GNR gNodeB 424 is an example of primary access node 120, although access node 120 may differ. 5GNR gNodeB 424 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. 5GNR BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 436 and to exchange user data between 5GNR UE 411 and UPF 437.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

5GNR UE 411 is wirelessly coupled to the antennas in 5GNR radio 601 over a 5GNR link. The transceiver in 5GNR radio 601 is coupled to a transceiver in 5GNR BBU 602 over CPRI links. A transceiver in 5GNR BBU 602 is coupled to AMF 436 and UPF 437 over backhaul links. In 5GNR radio 601, the antennas receive wireless 5GNR signals from 5GNR UE 411 that transport UL 5GNR signaling and UL 5GNR data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5G RRC in 5GNR BBU 602 processes the UL 5GNR signaling and DL N2 signaling from AMF 436 to generate new UL N2 signaling and new DL 5GNR signaling. The 5GNR RRC transfers the new UL N2 signaling to AMF 436. The 5GNR SDAP in 5GNR BBU 602 transfers the UL 5GNR data to UPF 437 over backhaul links.

In 5GNR BBU 602, the 5GNR RRC receives the DL N2 signaling from AMF 436. The 5GNR SDAP receives DL 5GNR data from UPF 437. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling and DL 5GNR data to 5GNR UE 411.

In operation, 5GNR UE 411 attaches to the 5GNR RRC in BBU 602 in indicates is 5G capabilities. The 5GNR RRC in BBU 602 requests data service for UE 411 from 5GC AMF 436 over N2 signaling and indicates its 5G RAT capabilities. 5GC AMF 436 interacts with 5GC SMF 438, 5GC AUSF 439, 5GC UDM 441, and 5GC PCF 440 to authenticate and authorize 5GNR UE 411 for 5G RAT data services and MMW data services. 5GC AMF 436 generates 5G instructions for 5GNR UE 411 responsive to the 5G UE capabilities and the authorization. 5GC AMF 436 transfers quality-of-service metrics, network addressing, and 5G instructions for UE 411 to the 5GNR RRC in BBU 602 and 5GC SMF 438. 5GC SMF 438 directs 5GC UPF 437 to serve UE 411 per the quality-of-service metrics and network addressing over 5GNR gNodeB 424. The 5GNR RRC in BBU 602 transfers the quality-of-service metrics, network addressing, and 5G instructions to UE 411.

In response to the 5G instructions, UE 411 measures signal strengths for 5G MMW node 425 and 5G RAT node 426 and wirelessly transfers the signal strengths to the 5GNR RRC in BBU 602 over 5GNR radio 601. The 5GNR RRC in BBU 602 determines the frequency offset, and hysteresis for 5G MMW node 425 and for 5G RAT node 426. The 5GNR RRC in BBU 602 determines an inter-RAT addition threshold for 5G MMW node 425 and an inter-RAT addition threshold for 5G RAT node 426 based on the amount of RRC connected UEs served by 5GNR gNodeB 424. 5GNR gNodeB 424 determines an inter-RAT addition value for 5G MMW node 425 based on the signal strength for 5G MMW node 425, the frequency offset, and the hysteresis. 5GNR gNodeB 424 determines an inter-RAT addition value for 5G RAT node 426 based on the signal strength for 5G RAT node 426, the frequency offset, and the hysteresis.

The 5GNR RRC in BBU 602 determines when the inter-RAT addition values are greater than their corresponding inter-RAT addition thresholds. When the inter-RAT addition value for 5G MMW node 425 is greater than the inter-RAT addition threshold for 5G MMW node 425, the 5GNR RRC in BBU 602 directs 5G MMW node 425 to serve UE 411 and directs UE 411 to attach to 5G MMW node 425. When the inter-RAT addition value for 5G RAT node 426 is greater than the inter-RAT addition threshold for 5G-RAT node 426, the 5GNR RRC in BBU 602 directs 5G-RAT node 426 to serve UE 411 and directs UE 411 to attach to 5G-RAT node 426. 5GNR gNodeB 424 notifies 5GC AMF 436. 5GC AMF 436 directs 5GC SMF 438 to direct 5GC UPF 437 to serve UE 411 per the quality-of-service metrics and network addressing over 5G MMW node 425 and 5G-RAT node 426. 5GNR UE 411 attaches to 5G MMW node 425 and 5G-RAT node 426. 5G MMW node 425 and 5G RAT node 426 exchange user data with UE 411.

The 5GNR RRC in BBU 602 determines an inter-RAT drop threshold for 5G MMW node 425 and for 5G RAT node 426 based on the amount of RRC connected UEs served by 5GNR gNodeB 424. The 5GNR RRC in BBU 602 receives subsequent signal strength measurements from UE 411 for 5G MMW node 425 and 5G RAT node 426. The 5GNR RRC in BBU 602 determines an inter-RAT drop value for 5G MMW node 425 based on the subsequent signal strength for 5G MMW node 425, the frequency offset, and the hysteresis. The 5GNR RRC in BBU 602 determines an inter-RAT drop value for 5G RAT node 426 based on the subsequent signal strength for 5G RAT node 426, the frequency offset, and the hysteresis. When the drop value for 5G MMW node 425 is lower than the drop threshold 5G MMW node 425, the 5GNR RRC in BBU 602 signals UE 411 to detach from 5G MMW node 425 and 5G MMW node 425 stops exchanging the user data with UE 411. When the drop value for 5G RAT node 426 is lower than the drop threshold 5G RAT node 426, the 5GNR RRC in BBU 602 signals UE 411 to detach from 5G RAT node 426 and 5G RAT node 426 stops exchanging the user data with UE 411.

In some examples, the 5GNR RRC in BBU 602 determines the frequency band for 5G MMW node 425 and the frequency band for 5G RAT node 426. The 5GNR RRC in 5GNR BBU 602 may determine the channel size of the frequency bands, the amount of noise and/or interference for the frequency bands, the signal quality of the frequency bands, the frequency level (e.g. "high frequency" or "low frequency") of the frequency bands, or some other frequency measurement. In this example, the 5GNR RRC in BBU 602 may determine inter-RAT add/drop thresholds for 5G MMW node 425 and 5G RAT node 426 based on the amount of RRC connected UEs served by 5GNR BBU 602 and the frequency bands of 5G MMW node 425 and 5G RAT node 426. Typically, the 5GNR RRC may select a relatively high inter-RAT threshold when the channel size of the frequency band is small, the noise level for the frequency band is high, the signal quality of the frequency band is low, and/or the frequency band is high frequency. Conversely, the 5GNR RRC may select a relatively low inter-RAT threshold when the channel size of the frequency band is large, the noise level for the frequency band is low, the signal quality of the frequency band is high, and/or the frequency band is low frequency.

Figure 7:
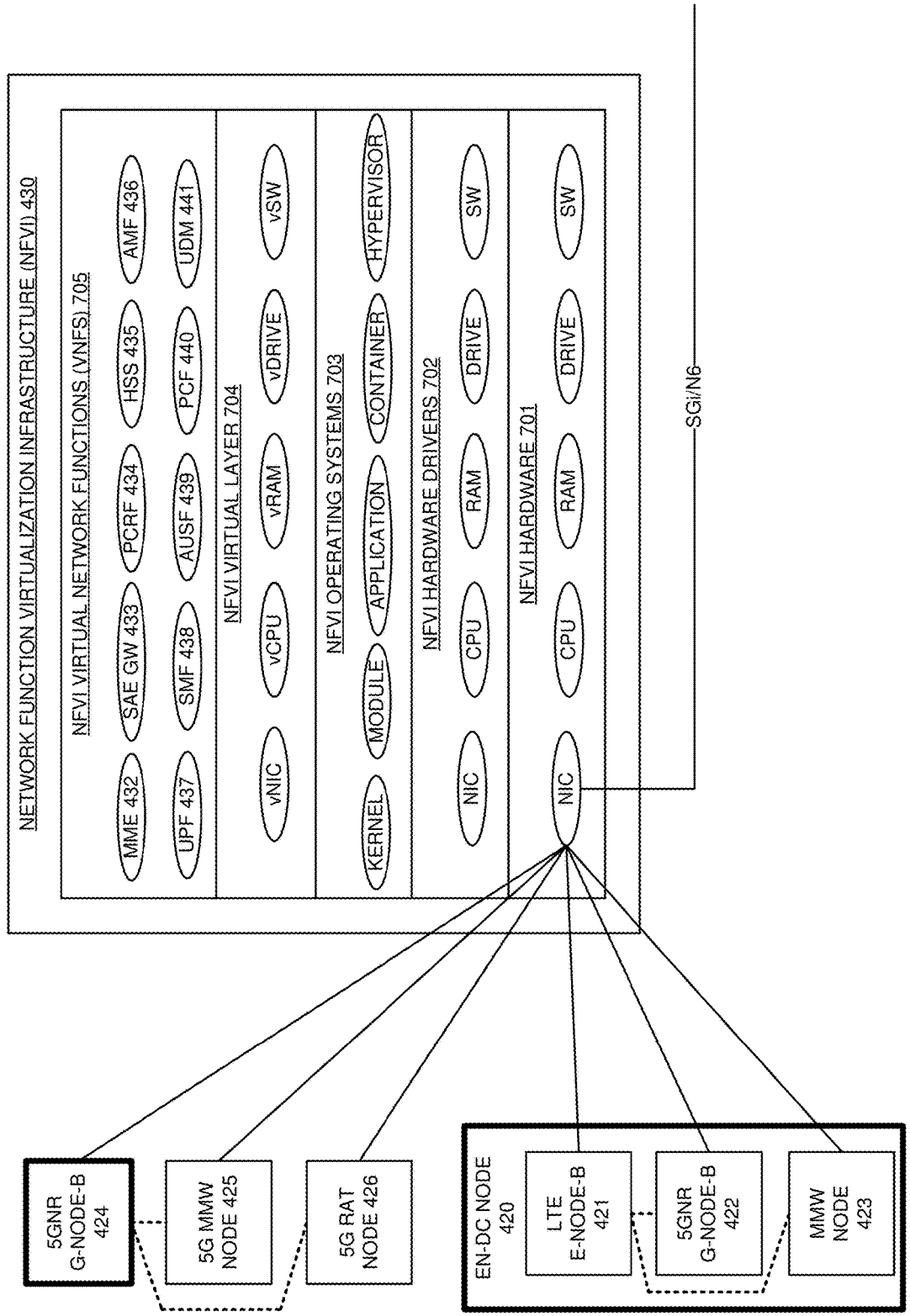
FIG. 7 illustrates a Network Function Virtualization Infrastructure (NFVI) to serve UEs over multiple wireless links based on the amount of RRC connected wireless UEs.

FIG. 7 illustrates Network Function Virtualization Infrastructure (NFVI) 430 to serve UEs 410-411 over multiple wireless links based on an amount of RRC connected UEs. NFVI 430 is an example of network elements 150, although network elements 150 may differ. NFVI 430 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise MME 432, SAE GW 433, PCRF 434, HSS 435, AMF 436, UPF 437, SMF 438, AUSF 439, PCF 440, and UDM 441. Other LTE VNFs and 5GC VNFs are typically present but are omitted for clarity. The NIC is coupled to EN-DC node 420, 5GNR gNodeB 424, 5G MMW node 425, 5G RAT node 426, and to external systems. NFVI hardware 701 executes NFVI hardware drivers 702, NFVI operating systems 703, NFVI virtual layer 704, and NFVI VNFs 705 to serve UEs 410-411 over EN-DC node 420, 5GNR gNodeB 424, 5G MMW node 425, and 5G RAT node 426.

MME 432 receives S1-MME signaling from LTE eNodeB 421 that requests data services for UE 410 and indicates its 5G UE capabilities. MME 432 interacts with HSS 435 to authenticate and authorize UE 410 for wireless data services that are represented by APNs. MME 432 generates 5G instructions for UE 410 responsive to the 5G UE capabilities and the authorization. MME 432 transfers the APNs for UE 410 and UE 412 to SAE GW 433. SAE GW 433 interacts with PCRF 434 to select QCIs and network addresses for UE 410 based on the APNs. SAE GW 433 transfers the APNs, QCIs, and addresses to MME 432. MME 432 transfers the APNs, QCIs, network addresses, and 5G instructions for UE 410 to LTE eNodeB 421. MME 432 receives S1-MME signaling from LTE eNodeB 421 for UE 410. SAE GW 433 433 exchanges user data for UE 410 with external systems. SAE GW 433 exchanges the user with LTE eNodeB 421, 5GNR gNodeB 422, and MMW node 423.

AMF 436 receives N2 signaling from 5GNR gNodeB 424 that requests data service for UE 411 and indicates its 5G UE capabilities. AMF 436 interacts with SMF 438, AUSF 439, PCF 440, and UDM 441 to authenticate and authorize 5GNR UE 411 for 5G data services. AMF 436 generates 5G instructions responsive to the 5G UE capabilities and the authorization. AMF 436 transfers quality-of-service metrics, network addressing, and the 5G instructions for 5GNR UE 411 to 5GNR gNodeB 424. SMF 438 directs UPF 437 to serve UE 411 over 5GNR gNodeB 424 per the quality-of-service metrics and network addressing. AMF 437 receives N2 signaling from 5GNR gNodeB 424 indicating attachments per the 5G instructions. AMF 436 directs SMF 438 drive UPF 437 to serve UE 411 over 5G MMW node 425 and 5G RAT node 426 per the quality-of-service metrics and network addressing.

Figure 8:
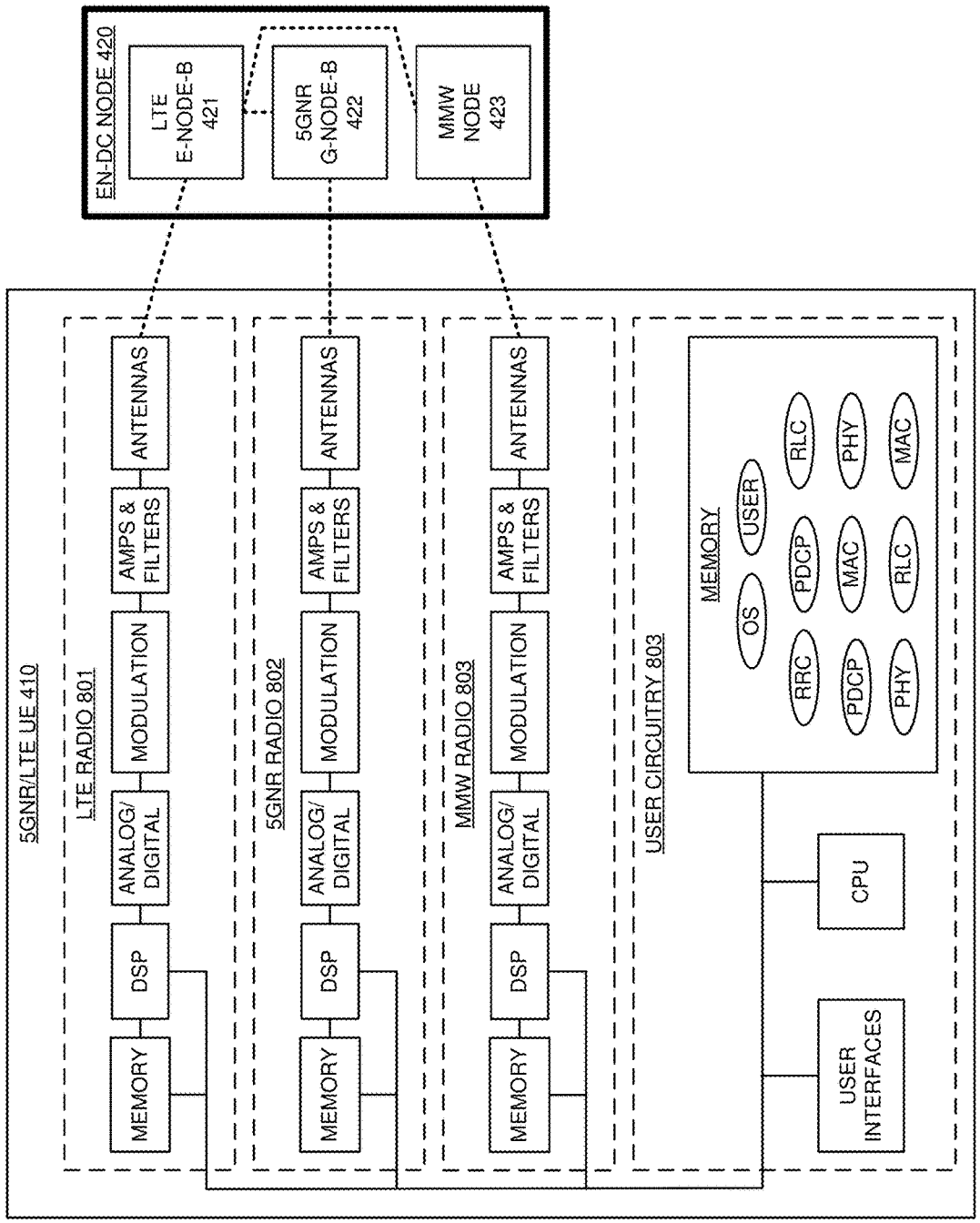
FIG. 8 illustrates a 5GNR/LTE UE that is served by the EN-DC access node based on the amount of RRC connected wireless UEs.

FIG. 8 illustrates 5GNR/LTE UE 410 that is served by EN-DC access node 420 over 5GNR based on an amount of RRC connected UEs. 5GNR/LTE UE 410 is an example of UE 101, although UE 101 may differ. UE 410 comprises LTE radio 801, 5GNR radio 802, MMW radio 803, and user circuitry 804 that are coupled over bus circuitry. Radios 801-803 comprise antennas, amplifiers, filters, modulation, analog-to-digital interfaces, DSP, and memory that are coupled over bus circuitry. User circuitry 804 comprises user interfaces, CPU, and memory that are coupled over bus circuitry.

The antennas in radios 801-803 are wirelessly coupled to LTE eNodeB 421, 5GNR gNodeB 422, and MMW node 423 on EN-DC node 420. The user interfaces in user circuitry 804 comprise graphic displays, machine controllers, sensors, cameras, transceivers, and/or some other user components. The memory in user circuitry 804 stores an operating system, user applications (USER), and network applications (PHY, MAC, RLC, PDCP, and RRC). The CPU in user circuitry 804 executes the operating system and the user applications to generate and consume user data. The CPU in user circuitry 804 executes the operating system and the network applications to wirelessly exchange corresponding signaling and data with LTE eNodeB 421, 5GNR gNodeB 422, and MMW node 423 over radios 801-803.

The LTE RRC in UE 410 wirelessly attaches to LTE eNodeB 421 over antennas in LTE radio 801. The LTE RRC in UE 410 generates UL LTE signaling and UL LTE data. The UL signaling indicates 5G capabilities for UE 410. The LTE network applications in UE 410 process the UL LTE signaling and the UL LTE data to generate corresponding UL LTE symbols that carry the UL LTE signaling, UL LTE data, and 5G UE capabilities. The LTE DSP in LTE radio 801 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5G UE capabilities) and UL LTE data for UE 410 to LTE eNodeB 421.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates 5G instructions, APNs, QCIs, and network addresses from LTE eNodeB 421.

In response to the 5G instructions, the LTE RRC in UE 410 directs the 5GNR PHYs to measure 5GNR signal strength of the 5GNR signal from 5GNR gNodeB 422 and directs the MMW PHYs to measure the MMW signal strength of the MMW signal for MMW node 423. The 5GNR PHYs report the 5GNR signal strength and the MMW PHYs report the MMW signal strength to the LTE RRC. The LTE RRC in UE 410 transfers the 5GNR and MMW signal strengths to LTE eNodeB 421. LTE eNodeB 421 determines a B1 addition threshold based on the amount of RRC connected UEs served by LTE eNodeB 421. LTE eNodeB 421 determines inter-RAT addition values based on the 5GNR signal strength and the MMW signal strength. When the 5GNR inter-RAT addition value is greater than the 5GNR B1 addition threshold, LTE eNodeB 421 directs the 5GNR PDCP in UE 410 to attach to 5GNR gNodeB 422. 5GNR gNodeB 422 exchanges user data for UE 410 with the 5GNR PDCP in UE 410. When the MMW inter-RAT addition value is greater than the MMW B1 addition threshold, LTE eNodeB 421 directs the MMW PDCP in UE 410 to attach to MMW node 423. MMW node 423 exchanges user data for UE 410 with the MMW PDCP in UE 410.

LTE eNodeB 421 determines a B1 drop threshold for 5GNR gNodeB 422 and a B1 drop threshold for MMW node 423 based on the amount of RRC connected UEs served by LTE eNodeB 421. The LTE RRC in UE 410 directs the 5GNR PHYs to measure subsequent 5GNR signal strength of 5GNR gNodeB 422 and directs the MMW PHYs to measure subsequent MMW signal strength of MMW node 423. The 5GNR PHYs and the MMW PHYs report the subsequent signal strengths to the LTE RRC. The LTE RRC in UE 410 wirelessly transfers the subsequent 5GNR signal strength and MMW signal strength to LTE eNodeB 421. LTE eNodeB 421 determines an inter-RAT drop value for 5GNR gNodeB 422 based on the subsequent 5GNR signal strength and an inter-RAT drop value for MMW node 423 based on the subsequent MMW signal strength. When the inter-RAT drop value for 5GNR gNodeB 422 is lower than the B1 drop threshold for 5GNR gNodeB 422, LTE eNodeB 421 signals the 5GNR PDCP in UE 410 to detach from 5GNR gNodeB 422. The 5GNR PDCP in UE 410 detaches from 5GNR gNodeB 422. When the inter-RAT drop value for MMW node 423 is lower than the B1 drop threshold for MMW node 423, LTE eNodeB 421 signals the MMW PDCP in UE 410 to detach from MMW node 423. The MMW PDCP in UE 410 detaches from MMW node 423.

Figure 9:
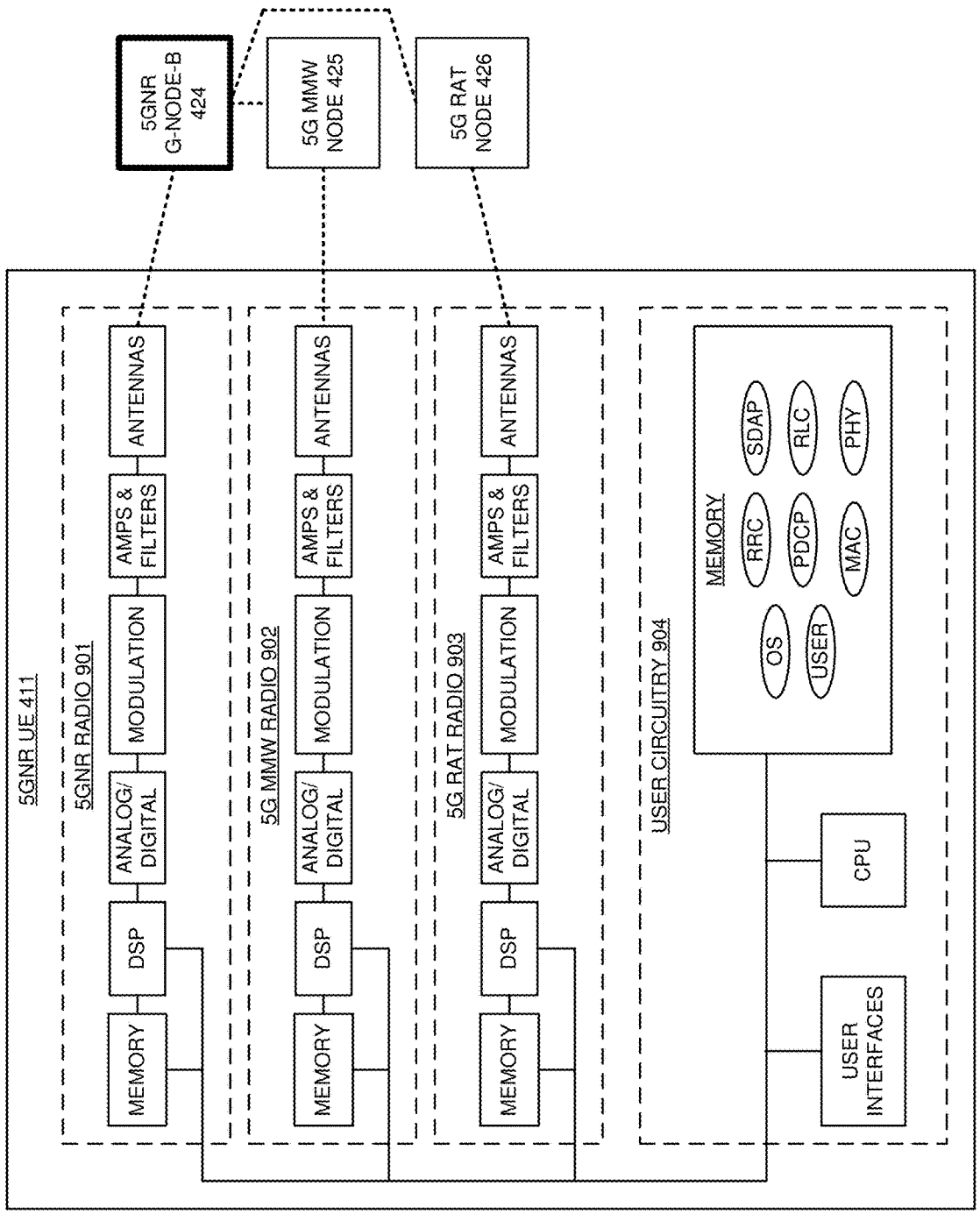
FIG. 9 illustrates a 5GNR UE that is served by the 5GNR gNodeB over multiple wireless links based on the amount of RRC connected wireless UEs.

FIG. 9 illustrates 5GNR UE 411 that is served by 5GNR gNodeB 424 based on an amount of RRC connected UEs. 5GNR UE 411 is an example of UE 101, although UE 101 may differ. UE 411 comprises 5GNR radio 901, 5G MMW radio 902, 5G RAT radio 903, and user circuitry 904 that are coupled over bus circuitry. 5GNR radio 901, 5G MMW radio 902, and 5G RAT radio 903 comprise antennas, amplifiers, filters, modulation, analog-to-digital interfaces, DSP, and memory that are coupled over bus circuitry. User circuitry 904 comprises user interfaces, CPU, and memory that are coupled over bus circuitry. The antennas in 5GNR radio 901 are wirelessly coupled to 5GNR gNodeB 424. The antennas in 5G MMW radio 902 are wirelessly coupled to 5G MMW node 425. The antennas in 5G RAT radio 903 are wirelessly coupled to 5G RAT node 426. The user interfaces in user circuitry 904 comprise graphic displays, machine controllers, sensors, cameras, transceivers, and/or some other user components. The memory in user circuitry 904 stores an operating system, user applications, and network applications (PHY, MAC, RLC, PDCP, SDAP, and RRC). The CPU in user circuitry 904 executes the operating system and the user applications to generate and consume user data. The CPU in user circuitry 904 executes the operating system and the network applications to wirelessly exchange corresponding signaling and data with 5GNR gNodeB 424 over 5GNR radio 901, with 5G MMW node 425 over 5G MMW radio 902, and with 5G RAT node 426 over 5G RAT radio 903.

The 5GNR RRC in UE 411 wirelessly attaches to 5GNR gNodeB 424 over antennas in 5GNR radio 901. The 5GNR RRC generates 5GNR signals that transport UL 5GNR signaling and UL 5GNR data. The 5GNR signaling indicates 5G capabilities for UE 411—including UE capabilities for 5G MMW node 425 and 5G RAT node 426. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 901 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating 5G capabilities) and UL 5GNR data for UE 411 to 5GNR gNodeB 424.

The 5G RAT antennas 5GNR radio 901 receive wireless DL signals that have DL 5GNR signaling and DL 5GNR data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling and the DL 5GNR data. The DL 5GNR signaling has 5G instructions, QoS levels, network addresses, and the like.

In response to the 5G instructions, the 5GNR RRC in UE 411 directs the MMW PHYs in UE 411 to measure MMW signal strength for 5G MMW node 425 and directs the 5G RAT PHYs in UE 411 to measure the 5G RAT signal strength for 5G RAT node 426. The MMW PHYs and the 5G RAT PHYs report the signal strengths to the 5GNR RRC. The 5GNR RRC wirelessly transfers the signal strengths for 5G MMW node 425 and 5G RAT node 426 to 5GNR gNodeB 424. When the inter-RAT addition value for 5G MMW node 425 is greater than the inter-RAT addition threshold for 5G MMW node 425, 5GNR gNodeB 424 directs the MMW RRC in UE 411 to attach to 5G MMW node 425. The MMW RRC in 5GNR UE 411 attaches to 5G MMW node 425 over 5G MMW radio 902 and 5G MMW node 425 exchanges user data with the MMW SDAP. When the inter-RAT addition value for 5G RAT node 426 is greater than the inter-RAT addition threshold for 5G RAT node 426, 5GNR gNodeB 424 directs the 5G RAT RRC in UE 411 to attach to 5G RAT node 426. The 5G RAT RRC in 5GNR UE 411 attaches to 5G RAT node 426 over 5G RAT radio 903 and 5G RAT node 426 exchanges user data with the 5G RAT SDAP.

The 5GNR RRC in UE 411 directs the 5G RAT PHYs in UE 411 to measure subsequent signal strengths for 5G MMW node 425 and for 5G RAT node 426. The MMW PHYs report the subsequent MMW signal strength to the 5GNR RRC and the 5G RAT PHYs report the subsequent 5G RAT signal strength to the 5GNR RRC. The 5GNR RRC wirelessly transfers the subsequent signal strengths to 5GNR gNodeB 424. When the drop value for MMW node 425 is lower than the drop threshold for MMW node 425, the 5GNR RRC in 5GNR gNodeB 424 signals the MMW RRC in UE 411 to detach from 5G MMW node 425. 5G MMW node 425 to stops exchanging the user data with UE 411. When the drop value for 5G RAT node 426 is lower than the drop threshold for 5G RAT node 426, the 5GNR RRC in 5GNR gNodeB 424 signals the 5G RAT RRC in UE 411 to detach from 5G RAT node 426. 5G RAT node 426 stops exchanging the user data with UE 411.

Figure 10:
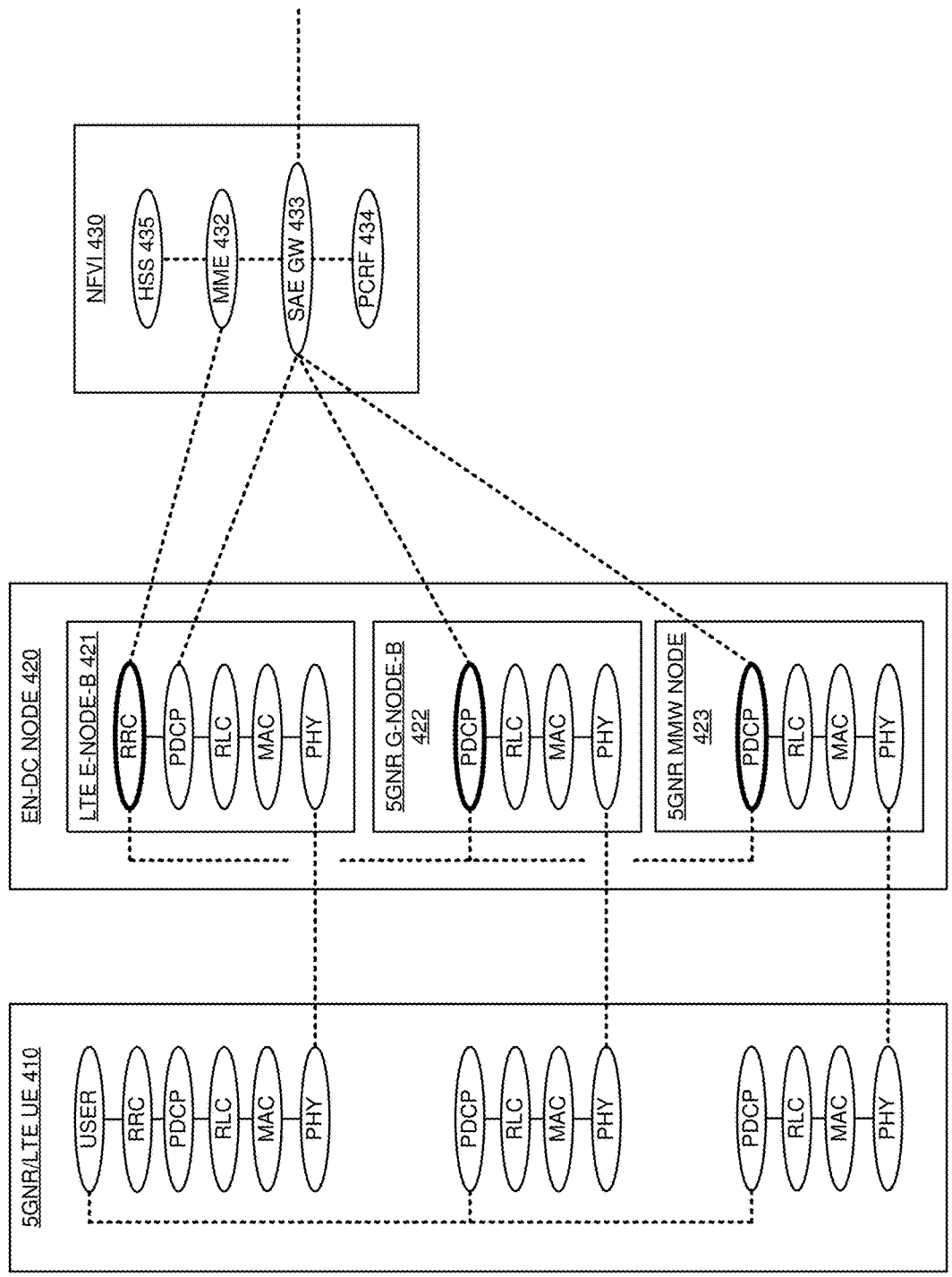
FIG. 10 illustrates an exemplary operation of the UEs, the EN-DC access node, and the NFVI to serve the 5GNR/LTE UE over multiple wireless links based on the amount of RRC connected wireless UEs.

FIG. 10 illustrates an exemplary operation of 5GNR/LTE UE 410, EN-DC access node 420, and NFVI 430 to serve 5GNR/LTE UE 410 over multiple wireless links based on an amount of RRC connected UEs. In 5GNR/LTE UE 410, a user application requests data communication, and the LTE RRC in UE 410 attaches to the LTE RRC in LTE eNodeB 421 over the LTE PDCPs, RLCs, MACs, and PHYs. The LTE RRC in UE 410 indicates 5G capabilities for UE 410 to the LTE RRC in LTE eNodeB 421. The LTE RRC in LTE eNodeB 421 transfers S1-MME signaling to MME 432 that requests data services and indicates the 5G capabilities for LTE UE 410.

MME 432 interacts with HSS 435 to authenticate and authorize UE 410 for wireless data services by APNs. MME 432 generates 5G instructions for UE 410 in response to the 5G authorization and the 5G capabilities. MME 432 transfers the APNs for UE 410 to SAE GW 433. SAE GW 433 interacts with PCRF 434 to select QCIs and network addresses for UE 410 based on the APNs. SAE GW 433 transfers the APNs, QCIs, and addresses to MME 432. MME 432 transfers the APNs, QCIs, network address, and 5G instructions for UE 410 to the RRC in LTE eNodeB 421. The RRC in LTE eNodeB 421 transfers the APNs, QCIs, network address, and 5G instructions to the LTE RRC in UE 410 over the PDCPs, RLCs, MACs, and PHYs. SAE GW 433 exchanges the user data with the PDCP in LTE eNodeB 421. The PDCP in LTE eNodeB 421 exchanges the user data with the LTE PDCP in UE 410 over the RLCs, MACs, and PHYs.

In response to the 5G instructions, the LTE RRC in UE 410 directs the 5GNR PHYs to measure 5GNR signal strength for 5GNR gNodeB 422 and directs the MMW PHYs to measure MMW signal strength for MMW node 423. The 5GNR PHYs and the MMW PHYs report the signal strengths to the LTE RRC in UE 410. The LTE RRC in UE 410 transfers the 5GNR signal strength and MMW signal strength to the LTE RRC in LTE eNodeB 421. The LTE RRC in LTE eNodeB 421 determines frequency offset and hysteresis for 5GNR gNodeB 422 and for MMW node 423. The LTE RRC in LTE eNodeB 421 determines a B1 addition threshold for 5GNR gNodeB 422 based on the amount of RRC connected UEs served by LTE eNodeB 421. Likewise, LTE eNodeB 421 determines a B1 addition threshold for MMW node 423 based on the amount of RRC connected UEs served by LTE eNodeB 421. The LTE RRC in LTE eNodeB 421 determines an inter-RAT addition value for 5GNR gNodeB 422 based on the 5GNR signal strength, the frequency offset, and the hysteresis. The LTE RRC in LTE eNodeB 421 determines an inter-RAT addition value for MMW node 423 based on the MMW signal strength, the frequency offset, and the hysteresis. The LTE RRC in LTE eNodeB 421 determines when the inter-RAT addition values are greater than their corresponding B1 addition threshold.

When the inter-RAT addition value for 5GNR gNodeB 422 is greater than the B1 addition threshold for 5GNR gNodeB 422, the LTE RRC in LTE eNodeB 421 directs the 5GNR PDCP in 5GNR gNodeB 422 to serve UE 410. Likewise, when the inter-RAT addition value for MMW node 423 is greater than the B1 addition threshold for MMW node 423, the LTE RRC in LTE eNodeB 421 directs the MMW PDCP in MMW node 423 to serve UE 410. The LTE RRC in eNodeB 423 directs the 5GNR PDCP in UE 410 to attach to the 5GNR PDCP in 5GNR gNodeB 422 over the 5GNR RLCs, MACs, and PHYs and directs the MMW PDCP in UE 410 to attach to the MMW PDCP in MMW node 423 over the MMW RLCs, MACs, and PHYs. The 5GNR PDCP attaches to the 5GNR PDCP in 5GNR gNodeB 422 and the MMW PDCP attaches to the MMW PDCP in MMW node 423.

The PDCPs in 5GNR gNodeB 422 and MMW node 423 request 5GNR and MMW service for UE 410 from the LTE RRC in LTE eNodeB 421 over X2 signaling. The LTE RRC in LTE eNodeB 421 requests the 5GNR and MMW service for UE 410 from MME 432 over S1-MME signaling. MME 432 directs SAE GW 433 to serve UE 410 over 5GNR gNodeB 422 and over MMW node 423. MME 432 transfers the APNs, QCIs, and network address for UE 410 to the RRC in LTE eNodeB 421. The LTE RRC in LTE eNodeB 421 transfers the APNs, QCIs, and network address to the 5GNR PDCP in 5GNR gNodeB 422 and to the MMW PDCP in MMW node 423 over X2 signaling. The PDCPs in 5GNR gNodeB 422 and MMW node 423 transfer the APNs, QCIs, and network address to the PDCPs in UE 410 over the RLCs, MACs, and PHYs. SAE GW 433 exchanges user data for UE 410 with external systems. SAE GW 432 exchanges the user data with the PDCPs in 5GNR gNodeB 422 and MMW node 423. The 5GNR PDCP in 5GNR gNodeB 422 exchanges the user data with the 5GNR PDCP in UE 410 over the RLCs, MACs, and PHYs. The MMW PDCP in MMW node 423 exchanges the user data with the MMW PDCP in UE 410 over the RLCs, MACs, and PHYs.

Figure 11:
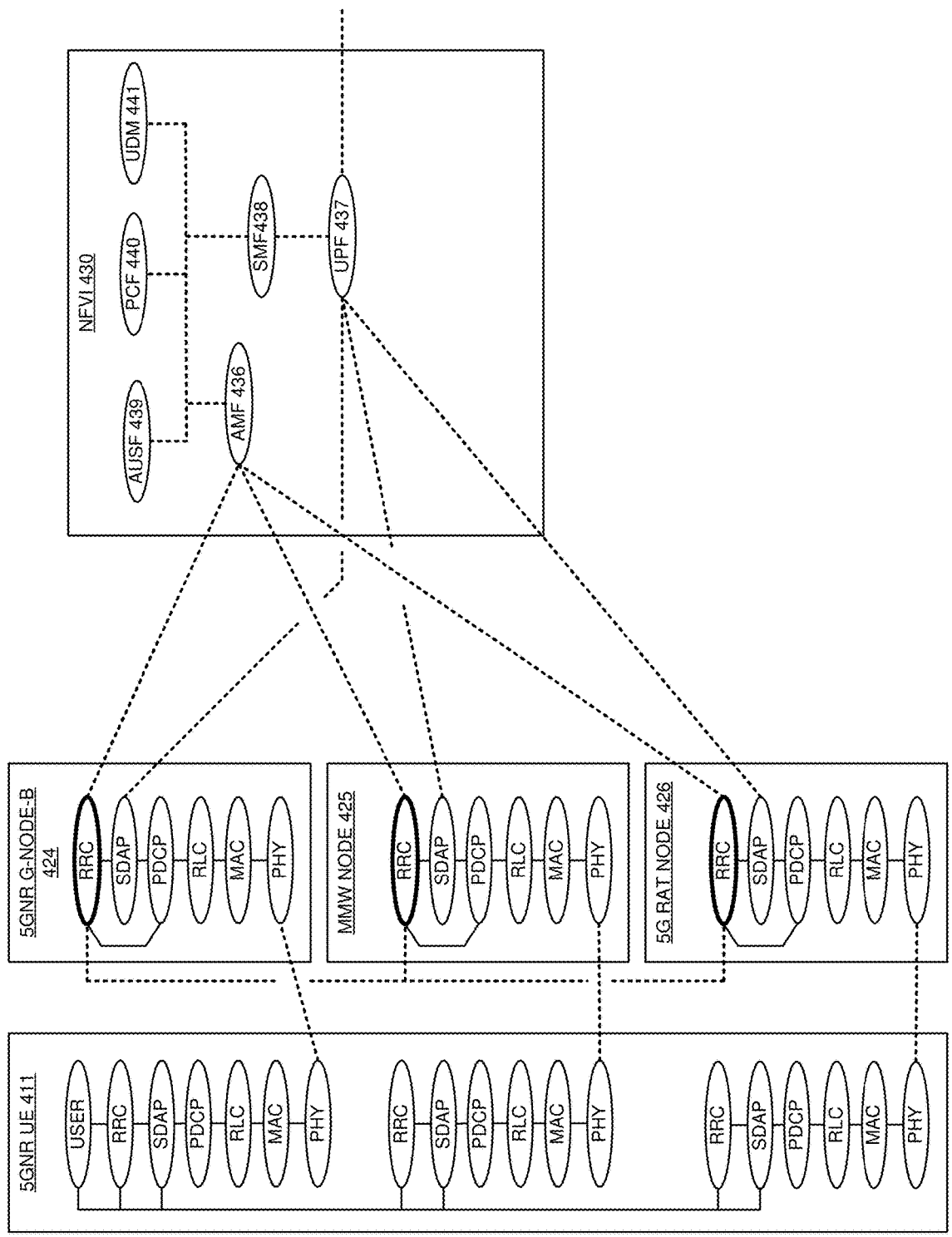
FIG. 11 illustrates an exemplary operation of the UEs, 5G access nodes, and the NFVI to serve the UEs over multiple wireless links based on the amount of RRC connected wireless UEs.

The RRC in LTE eNodeB 421 determines a B1 drop threshold for 5GNR gNodeB 422 and a B1 drop threshold for MMW node 423 based on the amount of RRC connected UEs served by LTE eNodeB 421. The LTE RRC in UE 410 directs the 5GNR PHYs to measure subsequent 5GNR signal strength and directs the MMW PHYs to measure subsequent MMW signal strength. The PHYs report the signal strengths to the LTE RRC in UE 410. The LTE RRC in UE 410 transfers subsequent signal strengths to the LTE RRC in LTE eNodeB 421 over their PDCPs, RLCs, MACs, and PHYs. The LTE RRC in LTE eNodeB 421 determines inter-RAT drop values for 5GNR gNodeB 422 based on the subsequent 5GNR signal strength and for MMW node 423 based on the subsequent MMW signal strength. The LTE RRC in LTE eNodeB 421 determines when the inter-RAT drop values are less than the B1 drop thresholds. When the inter-RAT drop values are less than the B1 drop thresholds, the LTE RRC in LTE eNodeB 421 directs the 5GNR PDCP in 5GNR gNodeB 422 and the MMW PDCP in MMW node 423 to stop serving UE 410 and notifies MME 432. The LTE RRC in LTE eNodeB 421 directs the 5GNR PDCP and the MMW PDCP in UE 410 to detach. UE 410 detaches from 5GNR gNodeB 422 and MMW node 423. MME 432 directs SAE GW 433 to stop serving UE 410 over 5GNR gNodeB 422 and MMW node 423. SAE GW 433 stops exchanging 5GNR data with the 5GNR PDCP in 5GNR gNodeB 422 and MMW data with the MMW PDCP in MMW node 423. The PDCPs in 5GNR gNodeB 422 and MMW node 423 stop exchanging the data with the PDCPs in UE 410 over the RLCs, MACs, and PHYs FIG. 11 illustrates an exemplary operation of UE 411, 5GNR gNodeB 424, 5G MMW node 425, 5G RAT node 426, and NFVI 430 to serve UE 411 over multiple wireless links based on an amount of RRC connected UEs. In 5GNR UE 411, a user application requests data communication, and the 5GNR RRCs in UE 411 attach to the 5GNR RRC in 5GNR gNodeB 424 over the 5G RAT PDCPs, RLCs, MACs, and PHYs. The 5GNR RRC in 5GNR gNodeB 424 sends a request for data services for 5GNR UE 411 in N2 signaling to AMF 436 over the backhaul links.

AMF 436 interacts with SMF 438, AUSF 439, PCF 440, UDM 441, and typically other functions to authenticate and authorize 5GNR UE 411 for 5G data services. SMF 438 directs UPF 437 to serve UE 411 per the quality-of-service metrics and network addressing. AMF 436 generates 5G instructions responsive to the 5G authorization and 5G UE capabilities. AMF 436 transfers quality-of-service metrics, network addressing, and 5G instructions for UE 411 to the 5GNR RRC in 5GNR gNodeB 424 in N2 signaling. The RRC in 5GNR gNodeB 424 transfers the quality-of-service metrics, network addressing, and 5G instructions to the RRCs in UE 411 over the PDCPs, RLCs, MACs, and PHYs.

In response to the 5G instructions, the 5GNR RRCs in 5GNR UE 411 direct the MMW PHYs in UE 411 to measure MMW signal strength for 5G MMW node 425 and direct the 5G RAT PHYs in UE 411 to measure 5G RAT signal strength for 5G RAT node 426. The PHYs report the signal strengths to the 5GNR RRC in UE 411. The 5GNR RRC wirelessly transfer the signal strengths to the 5GNR RRC in 5GNR gNodeB 424 over the PDCPs, RLCs, MACs, and PHYs. The 5GNR RRC in 5GNR gNodeB 424 determines the frequency offset, and the hysteresis for 5G MMW node 425 and for 5G RAT node 426. The 5GNR RRC in 5GNR gNodeB 424 determines inter-RAT addition thresholds for 5G MMW node 425 and 5G RAT node 426 based on the amount of RRC connected UEs served by 5GNR gNodeB 424.

The 5GNR RRC in 5GNR gNodeB 424 determines inter-RAT addition values for 5G MMW node 425 based on the MMW signal strength and for 5G RAT node 426 based on the 5G RAT signal strength. The 5GNR RRC in 5GNR gNodeB 424 determines when the inter-RAT addition values are greater than the inter-RAT addition thresholds. When the 5GNR RRC in 5GNR gNodeB 424 determines the inter-RAT addition value for 5G MMW node 425 is greater than the inter-RAT addition threshold for 5G MMW node 425, the 5GNR RRC in 5GNR gNodeB 424 directs the MMW RRC in 5G MMW node 425 to serve UE 411. When the 5GNR RRC in 5GNR gNodeB 424 determines the inter-RAT addition value for 5G RAT node 426 is greater than the inter-RAT addition threshold for 5G RAT node 426, the 5GNR RRC in 5GNR gNodeB 424 directs the 5G RAT RRC in 5G RAT node 426 to serve UE 411. The 5GNR RRC in 5GNR gNodeB 424 directs UE 411 to attach to 5G MMW node 425 and 5G RAT node 426. The RRCs in UE 411 attach to the RRC in 5G MMW node 425 and to the RRC in 5G RAT node 426 over the PDCPs, RLCs, MACs, and PHYs. The MMW RRC in 5G MMW node 425 requests MMW service for UE 411 from AMF 436. The 5G RAT RRC in 5G RAT node 426 requests 5G RAT service for UE 411 from AMF 436. UPF 437 exchanges user data for UE 411 with external systems. UPF 437 exchanges the user data with the SDAPs in 5G MMW node 425 and 5G RAT node 426. The SDAPs in 5G MMW node 425 and 5G RAT node 426 exchange the user data with the SDAPs in 5GNR UE 411 over the PDCPs, RLCs, MACs, and PHYs. The SDAPs in UE 411 exchange the user data with the user applications.

The 5GNR RRC in 5GNR gNodeB 424 determines inter-RAT drop thresholds for 5G MMW node 425 and 5G RAT node 426 based on the amount of RRC connected UEs served by 5GNR gNodeB 426. The RRCs in UE 411 direct the PHYs in UE 411 to measure subsequent signal strengths for 5G MMW node 425 and 5G RAT node 426. The PHYs report the subsequent signal strengths to the 5GNR RRC. The 5GNR RRC in UE 411 transfers the subsequent signal strengths to the 5GNR RRC in 5GNR gNodeB 424. The 5GNR RRC in 5GNR gNodeB 424 determines inter-RAT drop values for 5G MMW node 425 and for 5G RAT node 426 based on the subsequent signal strengths. The 5GNR RRC in 5GNR gNodeB 424 determines when the inter-RAT drop values are less than the inter-RAT drop thresholds. When the inter-RAT drop value for MMW node 425 is less than the inter-RAT drop threshold for MMW node 425, the 5GNR RRC in 5GNR gNodeB 424 directs the MMW RRC in 5G MMW node 425 to stop serving UE 411 and directs the MMW RRC in UE 411 to detach from the MMW RRC in 5G MMW node 425. Likewise, when the inter-RAT drop value for 5G RAT node 426 is less than the inter-RAT drop threshold for 5G RAT node 426, the 5GNR RRC in 5GNR gNodeB 424 directs the 5G RAT RRC in 5G RAT node 426 to stop serving UE 411 and directs the 5G RAT RRC in UE 411 to detach from the 5G RAT RRC in 5G MMW node 425. The RRC in 5G MMW node 425 and the RRC in 5G RAT node 426 stop exchanging the user data with the RRCs in UE 411 over their PDCPs, RLCs, MACs, and PHYs.

The wireless data network circuitry described above comprises computer hardware and software that form special-purpose network circuitry to serve wireless UEs over 5GNR, 5G RAT, and MMW based on the amount of active UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on the amount of active UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UE) with a wireless communication service over multiple wireless communication links, the method comprising:

a Primary Access (P1) node wirelessly receiving signal metrics for a First Support Access (S1) node and signal metrics for a Second Support Access (S2) node from the wireless UE, determining a First Add Threshold (S1TH) for the S1 node based on an amount of active wireless UEs served by the P1 node, determining a Second Add Threshold (S2TH) for the S2 node based on the amount of active wireless UEs served by the P1 node, converting the signal metrics for the S1 node into a First Add Value (S1AV) for the S1 node, converting the signal metrics for the S2 node into a Second Add Value (S2AV) for the S2 node, determining when the S1AV is greater than the S1TH, and determining when the S2AV is greater than the S2TH;

the P1 node signaling the S1 node to serve the wireless UE and signaling the wireless UE to attach to the S1 node when the S1AV is greater than the S1TH, and signaling the S2 node to serve the wireless UE and signaling the wireless UE to attach to the S2 node when the S2AV is greater than the S2TH;

the S1 node wirelessly transferring user data for the wireless communication service to the wireless UE responsive to the signaling from the P1 node;

the S2 node wirelessly transferring user data for the wireless communication service to the wireless UE responsive to the signaling from the P1 node;

the P1 node determining a First Drop Threshold (S1DT) for the S1 node based on the amount of active wireless UEs served by the P1 node, determining a Second Drop Threshold (S2DT) for the S2 node based on the amount of active wireless UEs served by the P1 node, receiving subsequent signal metrics for the S1 node from the wireless UE, receiving subsequent signal metrics for the S2 node from the wireless UE, converting the subsequent signal metrics for the S1 node into a First Drop Value (S1DV) for the S1 node, converting the subsequent signal metrics for the S2 node into a Second Drop Value (S2DV) for the S2 node, determining when the S1DV exceeds the S1DT, and determining when the S2DV exceeds the S2DT;

the P1 node signaling the S1 node to stop serving the wireless UE and signaling the wireless UE to detach from the S1 node when the S1DV exceeds the S1DT and signaling the S2 node to stop serving the wireless UE and signaling the wireless UE to detach from the S2 node when the S2DV exceeds the S2DT;

the S1 node stopping the wireless transfer of the user data for the wireless communication service to the wireless UE responsive to the subsequent signaling from the P1 node; and the S2 node stopping the wireless transfer of the user data for the wireless communication service to the wireless UE responsive to the subsequent signaling from the P1 node.

2. The method of claim 1 wherein:
the P1 node determining the S1TH comprises determining the S1TH based on the amount of active wireless UEs served by the P1 node and a frequency band of the S1 node;
the P1 node determining the S2TH comprises determining the S2TH based on the amount of active wireless UEs served by the P1 node and a frequency band of the S2 node; and
wherein the frequency band of the S1 node and the frequency band of the S2 node comprise non-overlapping frequency bands.

3. The method of claim 2 wherein:
the P1 node determining the S1TH comprises determining the S1TH based on the amount of active wireless UEs served by the P1 node and a channel size of the frequency band of the S1 node;
the P1 node determining the S2TH comprises determining the S2TH based on the amount of active wireless UEs served by the P1 node and a channel size of the frequency band of the S2 node; and
wherein the channel size of the frequency band of the S1 node and the channel size of the frequency band of the S2 node comprise different channel sizes.

4. The method of claim 1 wherein:
the P1 node determining the S1TH and the S2TH, determining the S1AV and the S2AV, determining when the S1AV is greater than the S1TH and when the S2AV is greater than the S2TH, signaling the S1 node and the S2 node, and signaling the wireless UE comprises a Fifth Generation New Radio (5GNR) access node determining the S1TH and the S2TH, determining the S1AV and the S2AV, determining when the S1AV is greater than the S1TH and when the S2AV is greater than the S2TH, signaling the S1 node and the S2 node, and signaling the wireless UE;
the S1 node wirelessly transferring the user data comprises a Fifth Generation Radio Access Technology (5G RAT) access node wirelessly transferring 5G RAT data; and
the S2 node wirelessly transferring the user data comprises a Millimeter Wave (MMW) access node wirelessly transferring MMW data.

5. The method of claim 4 wherein the 5GNR access node determining the S1TH and the S2TH, determining the S1AV and the S2AV, determining when the S1AV is greater than the S1TH and when the S2AV is greater than the S2TH, signaling the S1 node and the S2 node, and signaling the wireless UE comprises the 5GNR access node executing a Radio Resource Control (RRC) and the RRC determining the S1TH and the S2TH, determining the S1AV and the S2AV, determining when the S1AV is greater than the S1TH and when the S2AV is greater than the S2TH, signaling the 5G RAT access node and the MMW node, and signaling the wireless UE.

6. The method of claim 4 wherein:
the S1TH for the 5G RAT access node comprises a first Inter Radio Access Technology (inter-RAT) add threshold;
the S2TH for the MMW access node comprises a second inter-RAT add threshold; and
wherein the first inter-Rat add threshold and the second inter-RAT add threshold comprise different threshold values.

7. The method of claim 1 wherein:
the P1 access node determining the S1TH and the S2TH, determining the S1AV and the S2AV, determining when the S1AV is greater than the S1TH and when the S2AV is greater than the S2TH, signaling the S1 node and the S2 node, and signaling the wireless UE comprises an LTE access node determining the S1TH and the S2TH, determining the S1AV and the S2AV, determining when the S1AV is greater than the S1TH and when the S2AV is greater than the S2TH, signaling the S1 node and the S2 node, and signaling the wireless UE;
the S1 node wirelessly transferring the user data comprises a 5GNR access node wirelessly transferring 5GNR user data; and
the S2 node wirelessly transferring the user data comprises a Millimeter Wave (MMW) access node wirelessly transferring MMW user data.

8. The method of claim 7 wherein the LTE access node determining the S1TH and the S2TH, determining the S1AV and the S2AV, determining when the S1AV is greater than the S1TH and when the S2AV is greater than the S2TH, signaling the 5GNR access node and the MMW access node, and signaling the wireless UE comprises the LTE access node executing a RRC and the RRC determining the determining the S1TH and the S2TH, determining the S1AV and the S2AV, determining when the S1AV is greater than the S1TH and when the S2AV is greater than the S2TH, signaling the 5GNR access node and the MMW access node, and signaling the wireless UE.

9. The method of claim 7 wherein:
the S1TH for the 5GNR access node comprises a first Evolved Universal Terrestrial Radio Access Network Dual Connectivity (EN-DC) B1 add threshold;
the S2TH for the MMW access node comprises a second EN-DC B1 add threshold; and
wherein the first EN-DC B1 add threshold and the second EN-DC B1 add threshold comprise different add threshold values.

10. A wireless communication network to serve a wireless User Equipment (UE) with a wireless communication service over multiple wireless communication links, the wireless communication network comprising:

a Primary Access (P1) node configured to wirelessly receive signal metrics for a First Support Access (S1) node and signal metrics for a Second Support Access (S2) node from the wireless UE, determine a First Add Threshold (S1TH) for the S1 node based on an amount of active wireless UEs served by the P1 node, determine a Second Add Threshold (S2TH) for the S2 node based on the amount of active wireless UEs served by the P1 node, convert the signal metrics for the S1 node into a First Add Value (S1AV) for the S1 node, convert the signal metrics for the S2 node into a Second Add Value (S2AV) for the S2 node, determine when the S1AV is greater than the S1TH, and determine when the S2AV is greater than the S2TH;

the P1 node configured to signal the S1 node to serve the wireless UE and signal the wireless UE to attach to the S1 node when the S1AV is greater than the S1TH, and signal the S2 node to serve the wireless UE and signal the wireless UE to attach to the S2 node when the S2AV is greater than the S2TH;

the S1 node configured to wirelessly transfer user data for the wireless communication service to the wireless UE responsive to the signal from the P1 node;

the S2 node configured to wirelessly transfer user data for the wireless communication service to the wireless UE responsive to the signal from the P1;

the P1 node configured to determine a First Drop Threshold (S1DT) for the S1 node based on the amount of active wireless UEs served by the P1 node, determine a Second Drop Threshold (S2DT) for the S2 node based on the amount of active wireless UEs served by the P1 node, receive subsequent signal metrics for the S1 node from the wireless UE, receive subsequent signal metrics for the S2 node from the wireless UE, convert the subsequent signal metrics for the S1 node into a First Drop Value (S1DV) for the S1 node, convert the subsequent signal metrics for the S2 node into a Second Drop Value (S2DV) for the S2 node, determine when the S1DV exceeds the S1DT, and determine when the S2DV exceeds the S2DT;

the P1 node configured to signal the S1 node to stop serving the wireless UE and signal the wireless UE to detach from the S1 node when the S1DV exceeds the S1DT, and signal the S2 node to stop serving the wireless UE and signal the wireless UE to detach from the S2 node when the S2DV exceeds the S2DT;

the S1 node configured to stop the wireless transfer of the user data for the wireless communication service to the wireless UE responsive to the subsequent signal from the P1 node; and the S2 node configured to stop the wireless transfer of the user data for the wireless communication service to the wireless UE responsive to the subsequent signal from the P1 node.

11. The wireless communication network of claim 10 wherein:
the P1 node configured to determine the S1TH based on the amount of active wireless UEs served by the P1 node and a frequency band of the S1 node;
the P1 node configured to determine the S2TH based on the amount of active wireless UEs served by the P1 node and a frequency band of the S2 node; and
wherein the frequency band of the S1 node and the frequency band of the S2 node comprise non-overlapping frequency bands.

12. The wireless communication network of claim 11 wherein:
the P1 node configured to determine the S1TH based on the amount of active wireless UEs served by the P1 node and a channel size of the frequency band of the S1 node;
the P1 node configured to determine the S2TH based on the amount of active wireless UEs served by the P1 node and a channel size of the frequency band of the S2 node; and
wherein the channel size of the frequency band of the S1 node and the channel size of the frequency band of the S2 node comprise different channel sizes.

13. The wireless communication network of claim 10 wherein:
the P1 node configured to determine the S1TH and the S2TH, determine the S1AV and the S2AV, determine when the S1AV is greater than the S1TH and when the S2AV is greater than the S2TH, signal the S1 node and the S2 node, and signal the wireless UE comprises a Fifth Generation New Radio (5GNR) access node configured to determine the S1TH and the S2TH, determine the S1AV and the S2AV, determine when the S1AV is greater than the S1TH and when the S2AV is greater than the S2TH, signal the S1 node and the S2 node, and signal the wireless UE;
the S1 node configured to wirelessly transfer the user data comprises a Fifth Generation Radio Access Technology (5G RAT) access node configured to wirelessly transfer 5G RAT user data; and
the S2 node configured to wirelessly transfer the user data comprises a Millimeter Wave (MMW) access node configured to wirelessly transfer MMW user data.

14. The wireless communication network of claim 13 wherein the 5GNR access node configured to determine the S1TH and the S2TH, determine the S1AV and the S2AV, determine when the S1AV is greater than the S1TH and when the S2AV is greater than the S2TH, signal the 5G RAT node and the MMW node, and signal the wireless UE comprises the 5GNR access node configured to execute a Radio Resource Control (RRC) and the RRC configured to determine the S1TH and the S2TH, determine the S1AV and the S2AV, determine when the S1AV is greater that the S1TH and when the S2AV is greater than the S2TH, signal the 5GNR RAT access node and the MMW access node, and signal the wireless UE.

15. The wireless communication network of claim 13 wherein:
the S1TH for the 5G RAT access node comprises a first Inter Radio Access Technology (inter-RAT) add threshold;
the S2TH for the MMW access node comprises a second inter-RAT add threshold; and
wherein the first inter-RAT add threshold and the second inter-RAT add threshold comprise different add threshold values.

16. The wireless communication network of claim 10 wherein:
the P1 node configured to determine the S1TH and the S2TH, determine the S1AV and the S2AV, determine when the S1AV is greater than the S1TH and when the S2AV is greater than the S2TH, signal the S1 node and the S2 node, and signal the wireless UE comprises an LTE access node configured to determine the S1TH and the S2TH, determine the S1AV and the S2AV, determine when the S1AV is greater than the S1TH and when the S2AV is greater than the S2TH, signal the S1 node and the S2 node, and signal the wireless UE;

the S1 node configured to wirelessly transfer the user data comprises a 5GNR access node configured to wirelessly transfer 5GNR user data; and the S2 node configured to wirelessly transfer the user data comprises a Millimeter Wave (MMW) access node configured to wirelessly transfer MMW user data.

17. The wireless communication network of claim 16 wherein the LTE access node configured to determine the S1TH and the S2TH, determine the S1AV and the S2AV, determine when the S1AV is greater than the S1TH and when the S2AV is greater than the S2TH, signal the 5GNR access node and the MMW access node, and signal the wireless UE comprises the LTE access node configured to execute a RRC and the RRC configured to determine the S1TH and the S2TH, determine the S1AV and the S2AV, determine when the S1AV is greater than the S1TH and when S2AV is greater than the S2TH, signal the 5GNR access node and the MMW access node, and signal the wireless UE.

18. The wireless communication network of claim 16 wherein:

the S1TH for the 5GNR access node comprises a first Evolved Universal Terrestrial Radio Access Network Dual Connectivity (EN-DC) B1 add threshold;

the S2TH for the MMW access node comprises a second EN-DC B1 add threshold; and wherein the first EN-DC B1 add threshold and the second EN-DC B1 add threshold comprise different add threshold values.

* * * * *